July 20, 1954   R. A. SCHAFER   2,684,017
HYDRAULIC AND ELECTRIC CONTROL FOR MACHINE TOOLS
Filed March 26, 1952   19 Sheets-Sheet 1

INVENTOR:
Robert A. Schafer

July 20, 1954 R. A. SCHAFER 2,684,017
HYDRAULIC AND ELECTRIC CONTROL FOR MACHINE TOOLS
Filed March 26, 1952 19 Sheets-Sheet 4

INVENTOR.
Robert A. Schafer
BY
Ahlberg, Kupper & Iradolph
Attorneys.

INVENTOR.
Robert A. Schafer

July 20, 1954 R. A. SCHAFER 2,684,017
HYDRAULIC AND ELECTRIC CONTROL FOR MACHINE TOOLS
Filed March 26, 1952 19 Sheets-Sheet 7

INVENTOR:
Robert A. Schafer
BY
Ahlberg, Hupper & Gradolph
Attorneys.

July 20, 1954 R. A. SCHAFER 2,684,017
HYDRAULIC AND ELECTRIC CONTROL FOR MACHINE TOOLS
Filed March 26, 1952 19 Sheets-Sheet 11

(COARSE FEED FORWARD)

INVENTOR:
Robert A. Schafer
BY
Ahlberg, Hupper & Gradolph
Attorneys.

July 20, 1954  R. A. SCHAFER  2,684,017
HYDRAULIC AND ELECTRIC CONTROL FOR MACHINE TOOLS
Filed March 26, 1952  19 Sheets-Sheet 13

(RAPID REVERSE)

INVENTOR:
Robert A. Schafer
BY
Ahlberg, Hupper & Gradolph
Attorneys.

July 20, 1954  R. A. SCHAFER  2,684,017
HYDRAULIC AND ELECTRIC CONTROL FOR MACHINE TOOLS
Filed March 26, 1952  19 Sheets-Sheet 15

(FINE FEED REVERSE POSITION)

INVENTOR.
Robert A. Schafer
BY
Ahlberg, Kupper & Gradolph
Attorneys.

July 20, 1954   R. A. SCHAFER   2,684,017
HYDRAULIC AND ELECTRIC CONTROL FOR MACHINE TOOLS
Filed March 26, 1952   19 Sheets-Sheet 19

Patented July 20, 1954

2,684,017

UNITED STATES PATENT OFFICE 2,684,017

HYDRAULIC AND ELECTRIC CONTROL FOR MACHINE TOOLS

Robert A. Schafer, Richmond, Ind., assignor to National Automatic Tool Company, Inc., Richmond, Ind., a corporation of Indiana Application March 26, 1952, Serial No. 278,643

15 Claims. (Cl. 90—14)

My invention relates generally to hydraulic and electrical controls for machine tools, and more particularly to improved, simplified, and flexible controls which may be adapted for use with a variety of machine tools.

Generally speaking, it is one of the objects of my invention to provide improved controls which are readily accessible for inspection and servicing, which are assembled in a unit separate from the machine tool which is controlled thereby, in which the parts may be disassembled without the necessity of draining the oil from the reservoir, and in which the electrical circuits are in a large measure separate from the hydraulic controls.

More specifically, it is an object of the invention to provide a hydraulic and electric control system for drilling, tapping, boring, facing, and milling machine tools, and which may readily be adjusted to perform a variety of machine tool cycling operations.

It is a further object of the invention to obtain three feed rates forward and three feed rates in reverse, and stoppage of the hydraulic motor by three two-position spool valves.

A further object is to provide an improved hydraulic control unit which is devoid of piping except for two pipes connecting the unit to the hydraulic motor.

Other objects will become apparent from the following description, reference being had to the accompanying drawings, in which.

General description

Figure 1:
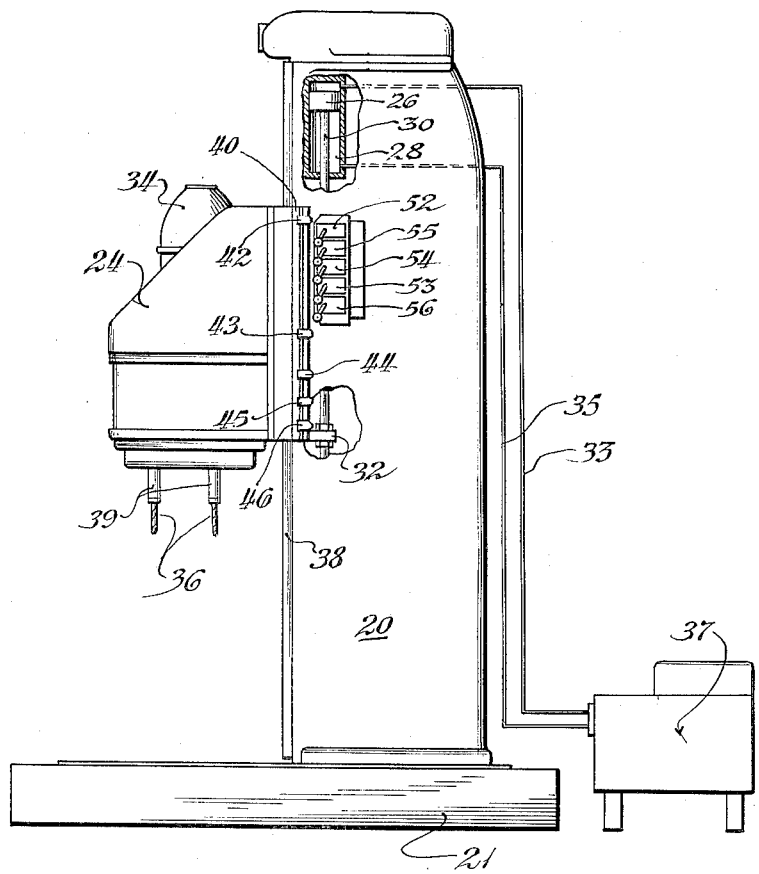
Fig. 1 is a right side elevational view of a representative machine tool, showing the manner in which the limit switches and their actuators are located, and the hydraulic control box, the column of the machine being broken away to show the hydraulic motor.
Figure 2:
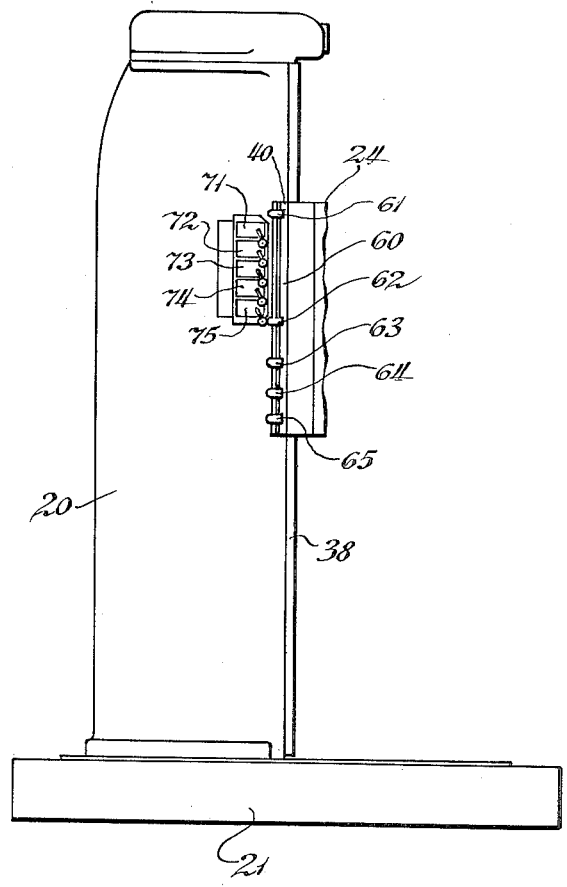
Fig. 2 is a left side elevation of a representative machine tool, showing additional limit switches and their operators.

The controls disclosed herein may be employed in a variety of machine tools as, for example, upon a drill press such as shown in Figs. 1 and 2. The multiple spindle drill press comprises a column 20 on a base 21, and has a head 24 which is raised and lowered by a reciprocatory hydraulic motor, shown as comprising a piston 26, slidable in a cylinder 28, which is suitably secured to the column. The piston has a rod 30 suitably secured to the tool carrying head 24 by a thrust bracket 32. Pipes 33 and 35 respectively connect the rod end and head end of the cylinder 28 to the combined reservoir and hydraulic control unit 37.

The head carries a motor 34 which drives spindles 39 and carrying tools 36, through suitable gearing. The head 24 is reciprocable upon ways 38, and on its right-hand side has a dog bracket 40 provided with a vertical T-shaped slot for the reception of bolt heads to adjustably clamp cams or dogs 42, 43, 44, 45, and 46 to the bracket 40. The dogs 42 and 46 project sidewardly the same distance from the dog bracket, while the intermediate dogs 43, 44, and 45 project different distances from the bracket so as to operate limit switches 52, 53, 54, 55, and 56.

On the left-hand side of the head 24, as shown in Fig. 2, there is a second dog bracket 60 which may in certain uses of the machine be provided with a plurality of dogs 61, 62, 63, 64, and 65, which may be set to operate limit switches 71, 72, 73, 74, and 75. These dogs likewise may extend sidewardly from the machine different distances so as to be in line with, and to engage, the rollers on the actuating arms on certain of the limit switches.

Figure 3:
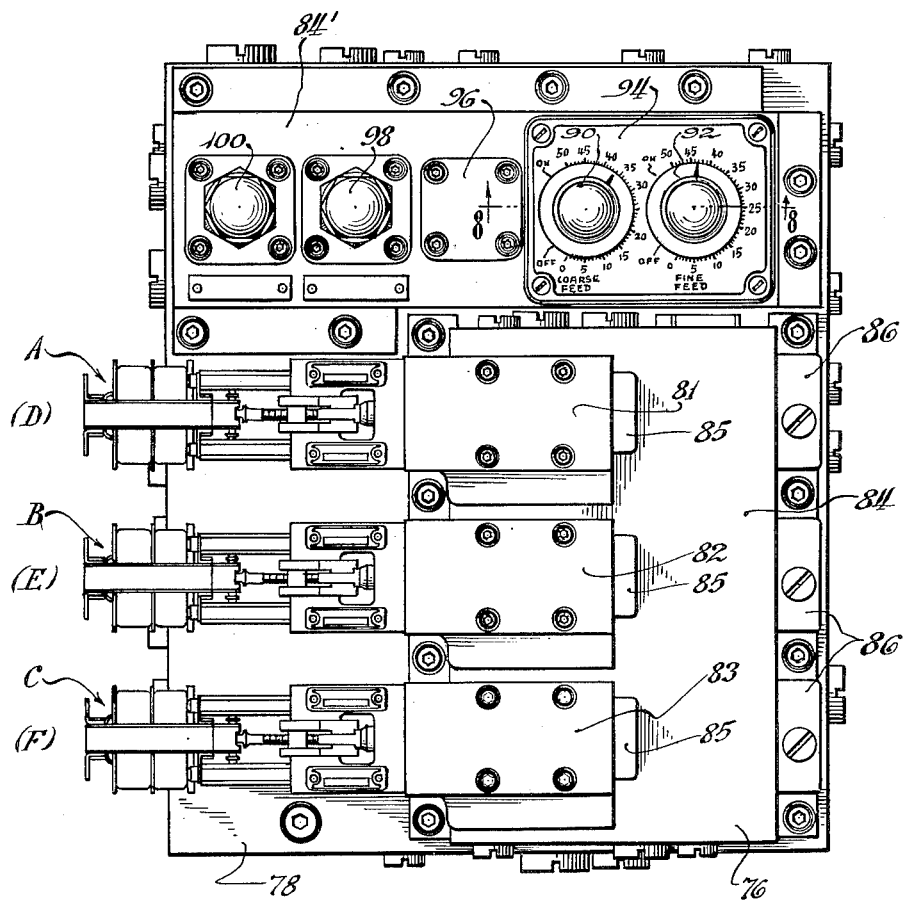
Fig. 3 is a plan view of the hydraulic control panel, showing the arrangement of the parts and including an illustration of the solenoids for actuating the valves.
Figure 4:
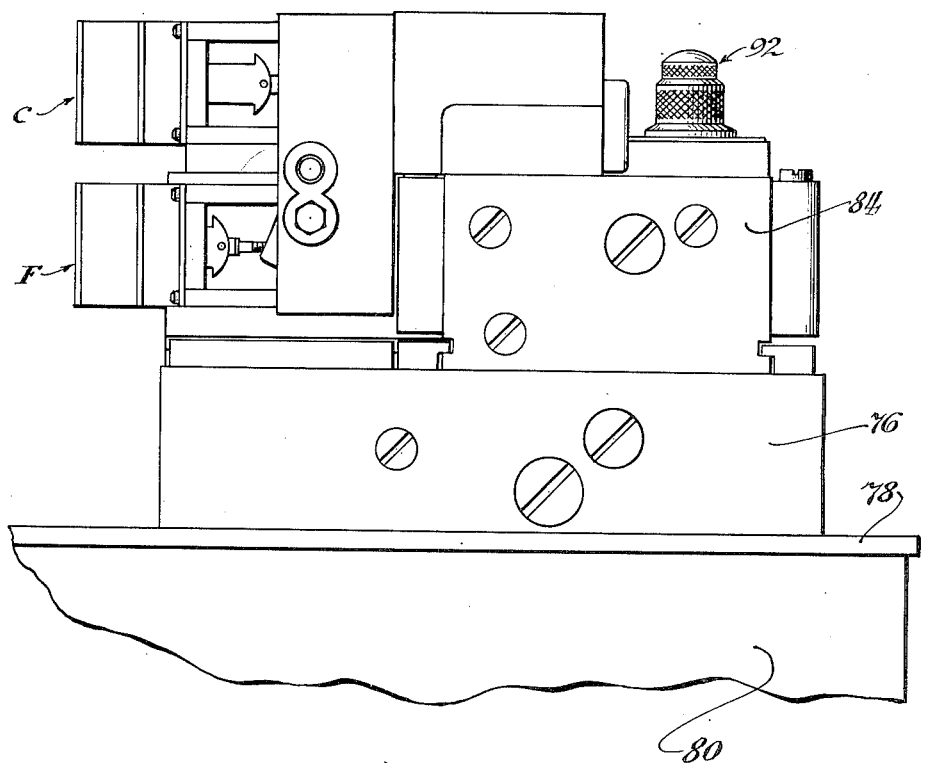
Fig. 4 is an end elevation of the hydraulic control panel shown in Fig. 3, and showing the manner in which it is mounted on the oil reservoir.
Figure 9:
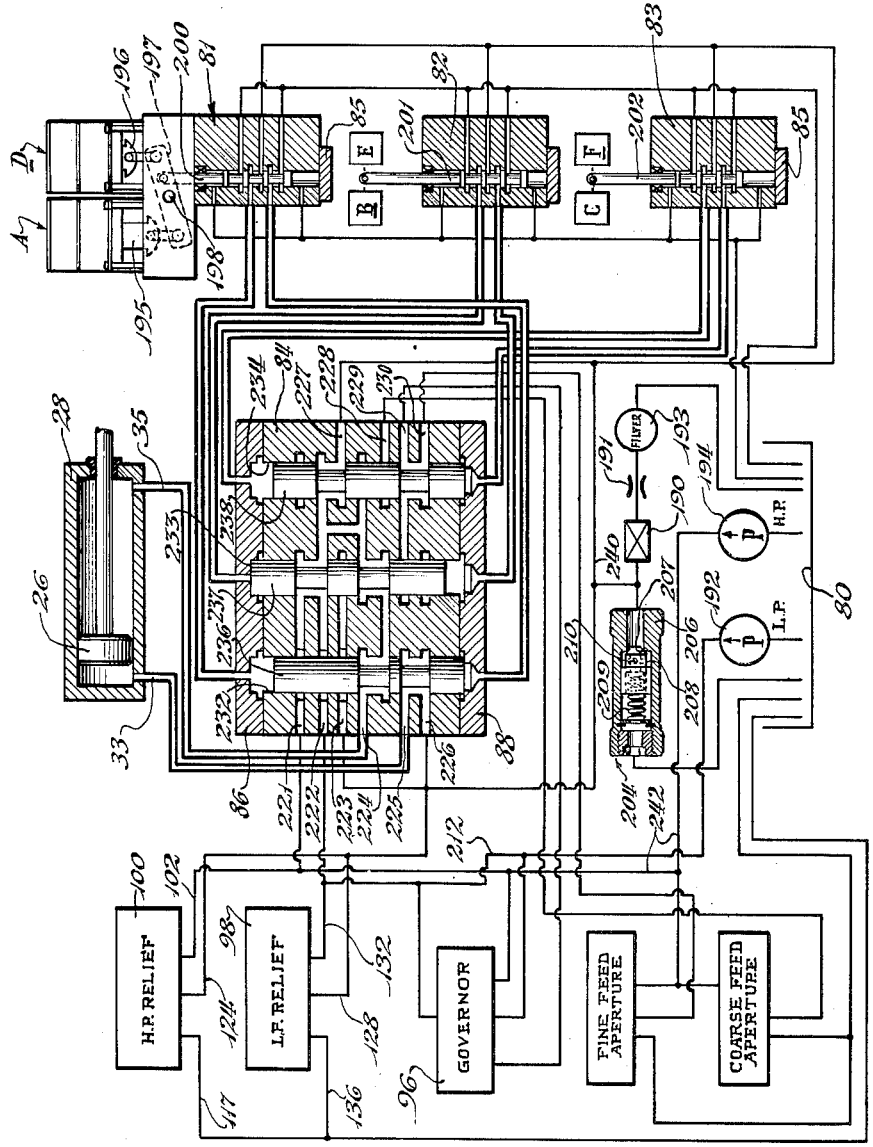
Fig. 9 is a diagrammatic and schematic view of the hydraulic controls, showing the various valves in the positions assumed when the head is at rest, namely, in the stop position.

The hydraulic controls, as shown in Figs. 3 and 4, are assembled in units upon a manifold plate 76, which in turn is mounted upon the top plate 78 of a reservoir 80. Three pilot valves 81, 82, and 83 are suitably secured to the upper surface of a valve block 84 having cap plates 86 secured along the right-hand edge thereof. Similar cap plates 88 are secured at the left-hand edge of the valve body 84 (Fig. 9). The manifold plate is drilled to provide numerous passageways to connect the various valves.

Figure 7:
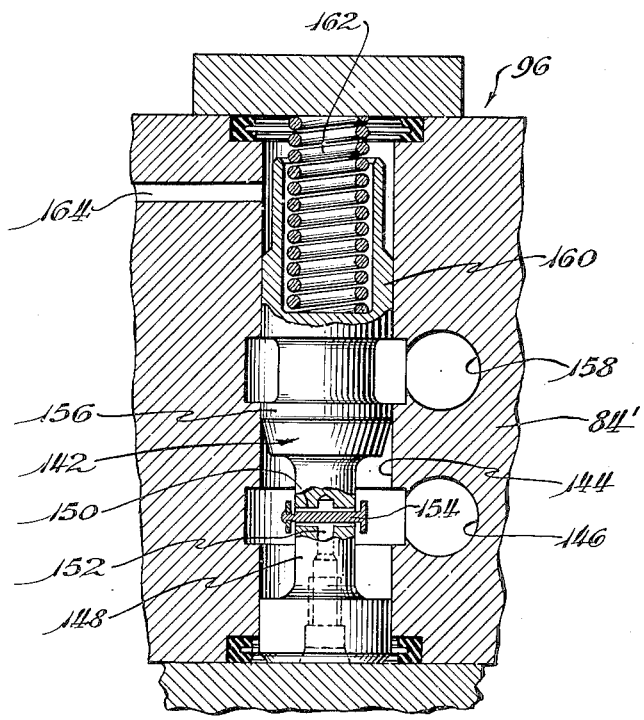
Fig. 7 is a central longitudinal sectional view of a pressure governor valve.
Figure 8:
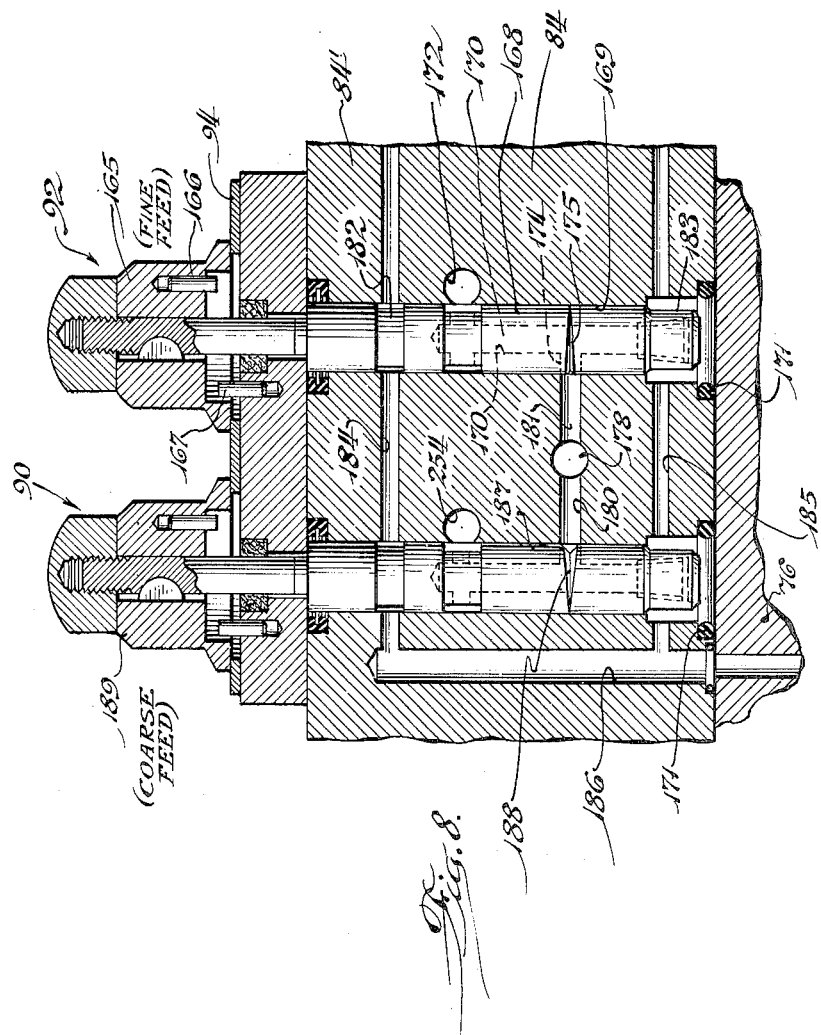
Fig. 8 is a fragmentary vertical sectional view, taken on the line 8—8 of Fig. 3.

A coarse feed valve 90 and a fine feed valve 92 are operated by knobs located above a graduated plate 94 (Figs. 4 and 8), which is secured to a valve block or body 84, for adjustment of the feed rates. A governor valve 96 is located in the valve body 84' as are also a low pressure relief valve 98 and a high pressure relief valve 100. The feed control valves are shown in Fig. 8, the governor in Fig. 7, the low pressure relief valve in Fig. 6, and the high pressure relief valve in Fig. 5.

The pilot valves 81 to 83 are operated by solenoids A, B, C, D, E, and F, the solenoids B, E, and F not being shown in Fig. 3, since they lie directly beneath the relays A, B, and C, respectively.

In describing the operation of the hydraulic system, the term "conduit" is frequently employed as providing communication between these various components. Except for the pipes leading to the motor cylinder 28, all conduits are formed as passageways in the valve body 84, or as by passageways in the manifold plate 76 or top plate 78 of the reservoir.

High pressure relief valve

Figure 5:
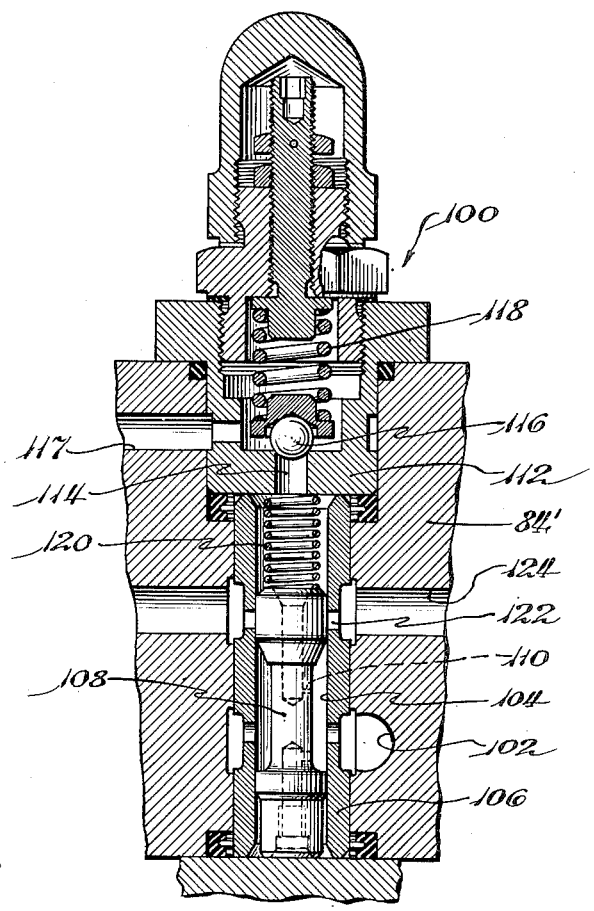
Fig. 5 is a central longitudinal sectional view of the high pressure control valve forming part of the system.

The hydraulic controls include the high pressure relief valve 100 shown in Fig. 5. As will appear later, this valve is used to prevent the output of the high pressure pump from exceeding a predetermined maximum pressure such, for example, as 1000 p. s. i. This valve is mounted in the valve body 84' and is of generally the same construction as that shown in the prior patent to Schafer et al., No. 2,377,720. Generally, however, it has an inlet passageway 102 which communicates with the lower end portion of a bore 104 formed in a liner 106. A plunger valve 108 is provided with a restricted passageway 110 through which the pressure of the oil on the opposite ends of the valve 108 may be equalized. A relief valve body 112 is mounted above the liner 106 and has a port 114 normally closed by a ball valve 116 held against its seat by a spring 118, the degree of compression of which may be adjusted. When the pressure above the plunger valve 108 becomes excessive, the spring pressed valve 116 is forced from its seat, thereby permitting a reduction in the pressure on the upper end of the valve 108, with the result that this valve will be forced upwardly against the downwardly applied force of a spring 120, thus uncovering ports 122 which are in communication with a passageway 124, which, as will hereinafter appear, leads to a return line in which the pressure is relatively low.

Low pressure relief valve

Figure 6:
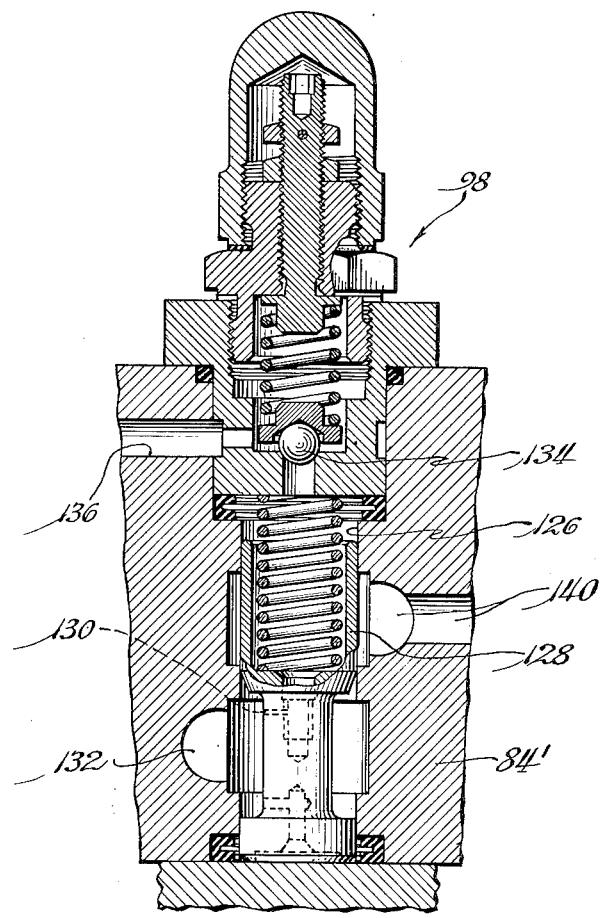
Fig. 6 is a similar view of a low pressure control valve.

The low pressure relief valve, shown in Fig. 6, is mounted in the body 84 and is provided with a bore 126 in which a valve 128 is reciprocable. This valve, like the high pressure relief valve, shown in Fig. 5, has a restricted passageway 130. Its lower end is in communication with a passageway 132 connected to the outlet of the low pressure pump, and prevents the pressure from building up beyond a predetermined value such, for example, as 300 p. s. i. This valve operates in substantially the same manner as the high pressure relief valve. The discharge past the loaded pilot valve 134 flows through a passageway 136 to the reservoir, while the oil discharged past the valve 128 flows through a passageway 140 to the reservoir, past a pressure retaining check valve to be described hereinafter.

Pressure differential governor valve

In the hydraulic control illustrated herein, the rate of flow, and hence the rate of movement of the hydraulic motor, is determined by adjustable apertures. In order that these metering apertures operate uniformly, it is necessary, or at least desirable, to maintain a constant differential pressure across them. A valve for accomplishing this purpose is shown in Fig. 7. A spool valve member 142 is slidable in a bore 144 in the valve body 84. Oil from the high pressure pump is supplied through a passageway 146 to the bore 144 adjacent the reduced diameter stem portion 148 of the valve 142. The stem portion 148 has a diametrically drilled hole 150 which communicates with a stepped diameter drilled hole 152 extending from the lower end of the valve to the cross drill hole 150. A suitable headed pin 154 is held within the hole 150 and forms a restriction, the pin being movable so as to prevent the restricted orifices from becoming clogged with foreign matter. This restriction is for the purpose of limiting the rate of flow of oil to the lower end face of the valve 142, and thus prevents rapid chattering movement of the valve.

The valve member 142 has a midsection 156 which controls the flow of oil from the passageway 146 to a passageway 158, the latter leading to the reservoir past a pressure maintaining check valve during the feed portions of the cycle. During other portions of the cycle, the passageway 158 is connected to the discharge side of the low pressure pump. The upper end of the valve 142 is provided with a piston-like portion 160 which is bored to receive a compression coil spring 162. The space surrounding the upper end of the valve member 142 is connected by a passageway 164 to the end of the motor to which the oil is fed. The spring 162 is of such strength that the desired differential pressure, such as approximately 40 p. s. i., is maintained across the feed rate orifice being employed.

Fine feed and coarse feed aperture valves

The fine feed aperture valve 92 is operated by a control knob 165 which is provided with a stop 166 cooperable with a fixed stop 167 to limit the rotation of the valve to somewhat less than one revolution. The knob 165 is secured to the rotary valve 168 which is rotatable in a suitable bore 169 in the valve body 84. The valve 168 has an axial passageway 170 which communicates at its upper end with a passageway 172 leading to the end of the hydraulic motor to which the oil is being fed. The valve 168 has a radial port 174 communicating with the axial passageway 170 drilled in the valve 168. A V-shaped groove 175 of varying width and depth, is formed in the cylindrical surface of the valve 168. That end of the groove which is of largest cross sectional area communicates with the port 174.

The discharge side of the high pressure pump is connected to a passageway 178 formed in the body 84, and this passageway has branches 180 and 181, the latter branch leading to the V-shaped groove 175. The valve 168 is provided with reduced diameter portions 182 and 183, which communicate with suitable passageways 184 and 185 which lead to the reservoir through a connecting passageway 186. The coarse feed aperture valve 187 controlled by the knob 189 is of construction identical with that of the fine feed valve, except for the increased size of its V-shaped groove 188.

*The hydraulic system—stop position*

Various components of the hydraulic elements of the control system have been described in general, these elements being old in the art except for details and the manner in which these elements are connected together. The operation of the hydraulic system to cause the tool carrying head to move through complicated cycles will not be described, it being assumed, for the present, that the electrical circuits completed by the limit switches 52 to 56 and 71 to 75 are operated by the dogs 42 to 46 and 61 to 65 in proper combinations to effect operation of the solenoids A to F in predetermined combinations at the proper time in the cycle.

In Fig. 9, the hydraulic system is schematically illustrated with the various valves and parts in the positions assumed when the tool carrying head is in its upper or "stop" position. The system includes a reservoir 80 from which a low pressure pump 192 and a high pressure pump 194 draw oil. When in the stop position, solenoids D, E, and F have been energized, this being indicated by underlining the reference character. In Fig. 9, solenoids A and D only are illustrated, the others being diagrammatically represented by blocks. As shown with reference to solenoids A and D, the plungers 195 and 196 are linked to a bar 197 pivoted on a pin 198. The stem of a pilot valve 200 is suitably connected to the bar 197 so as to be reciprocated thereby as the bar is pivoted due to the energization of one or the other of solenoids A or D. In a similar manner, the relays B and E are connected to operate a pilot valve 201 mounted for reciprocation in the valve body 82. A third pilot valve 202, mounted in the valve body 83, is similarly connected to be operated by relays C and F. The pilot valves 200, 201, and 202 may be identical in form and their valve bodies 81, 82, and 83 may likewise be identical. The pairs of solenoids, or the pilot valves, are provided with suitable detents to hold them in the positions to which they were moved by the last energized solenoid.

In the stop position, solenoids B, D, and F, having been energized last, pilot valves 200 and 202 are in raised position, while the pilot valve 201 is in its lower position, as shown in Fig. 9. (The pilot valves actually move horizontally, but for convenience of description it will be assumed that they move vertically.)

When these pilot valves are in this position in Fig. 9, both the high pressure and low pressure pumps are connected to discharge to the reservoir through a pressure maintaining check valve 204 which comprises a body 206 having a valve seat 207 against which a poppet type valve 208 is pressed by a compressed coil spring 209. It will be noted that the valve 208 is bored longitudinally and provided with cross drilled ports 210 near its seat engaging surface. This valve is provided to maintain a certain pressure in the system at all times so that oil under pressure will be available for control by the pilot valves, this pressure being in the order of 50 p. s. i. A very small proportion of oil returned to the reservoir passes through a manually operated shut-off valve 190, an orifice restriction 191, and a filter 193, illustrated diagrammatically in Fig. 9.

When in stop position, both pumps 192 and 194 have their discharge supplied to the inlet of the pressure maintaining valve 204 through the following paths: The outlet of the low pressure pump 192 is connected by a conduit 212 to a port 222 in the valve body 84. In addition to the port 222 in the valve body, there are ports 221, 223, 224, 225, 226, 227, 228, 229, and 230, these ports being variously connected to bores 232, 233, and 234 formed in the valve body for the reception of reciprocable spool valves 236, 237, and 238, respectively. The oil entering port 221 flows past the annular groove surrounding the valves 236, 237, and 238, and discharges from port 227 through a conduit 240 and past the pressure maintaining valve 204 to the reservoir 80.

The discharge of the high pressure pump under these conditions flows through a conduit 242 to port 221 in the valve body 84, thence around the annular grooves around valves 236, 237, and 238, to the port 227, to the conduit 240, and hence through the pressure maintaining valve 204 to the reservoir. Pressure is thus maintained in the conduit 240, and, it will be clear from Fig. 9, is also maintained in both ends of the motor cylinder 28. The pressure is not sufficiently high to move the tool carrying head 24.

It will be noted that the discharge of the low pressure pump 192 is at all times connected to the low pressure relief valve 98 through passageway 212 and branch passageway 132. The discharge of the high pressure pump 194 is at all times connected to the high pressure relief valve through conduit 242 and branch passageway 102.

*Operation of hydraulic components during rapid forward portion of the cycle*

Figure 10:
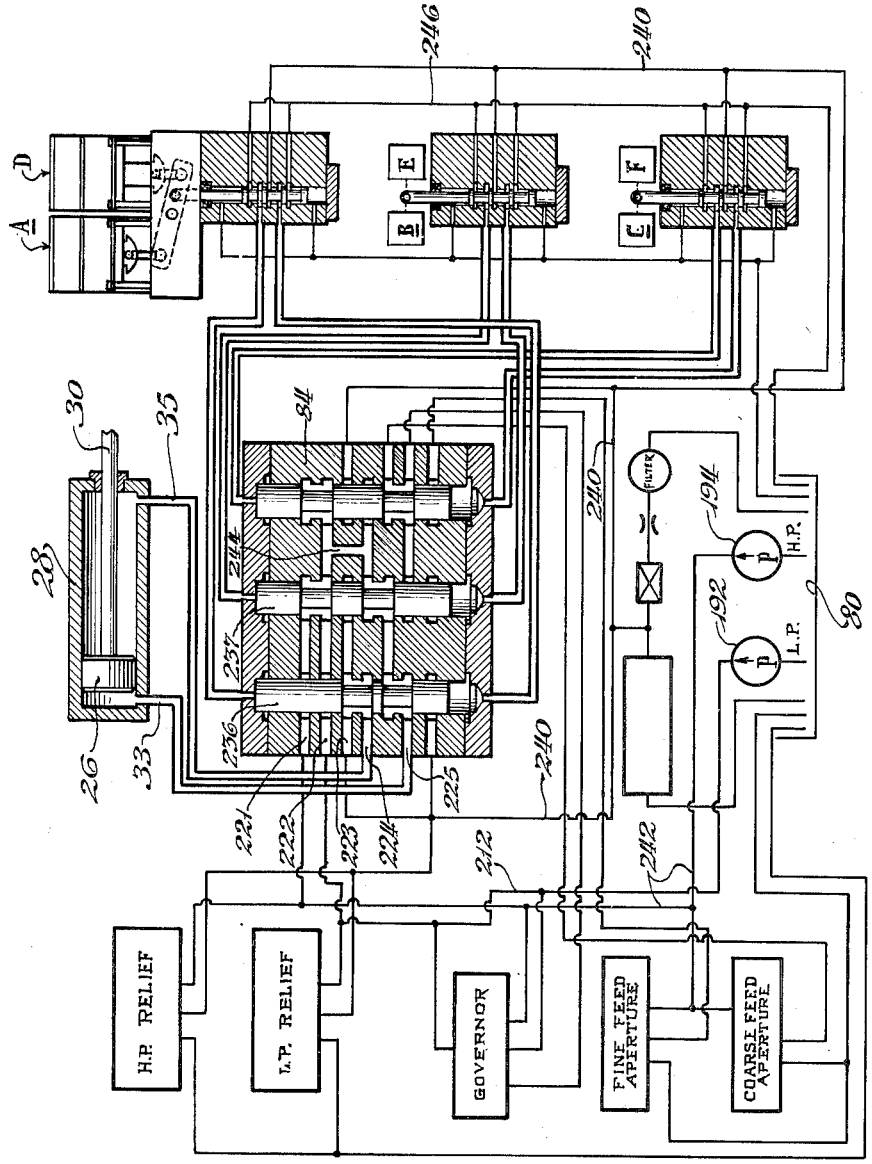
Fig. 10 is a similar view, showing the parts in the position assumed during the rapid forward portion of the cycle.

When the tool carrying head 24 is to be lowered rapidly to a position in which the tools are about to contact the work piece, the discharge of both the high pressure pump 194 and low pressure pump 192 is connected to the head end of the cylinder. This is accomplished by energizing solenoids A, B, and C, to cause all three pilot valves 200, 201, and 202 to be moved to their lower positions, as shown in Fig. 10. When in their lower positions, oil which is maintained under pressure in conduit 240 may flow through the pilot valves to the lower ends of the spool valve bores 232, 233, and 234, and oil from the upper ends of these bores may escape past these pilot valves to a conduit 246 which drains into the reservoir 80. When all three spool valves are in their raised position, oil may flow from the low pressure pump through conduit 212 to port 222 and hence around spool valves 236 and 237, through a vertical passageway 244, again around the spool valves 237 and 238, from port 225, and through pipe 33, to the head end of the cylinder 28 of the hydraulic motor.

At the same time, the discharge of the high pressure pump 194 is conveyed through conduit 242 to port 221, and its discharge is mingled with that from the low pressure pump at the annular grooves surrounding spool valve 237, and thereafter flows with the discharge of the low pressure pump to the head end of the cylinder 28.

Oil may escape from the rod end of the motor cylinder 28 through pipe 35 connected to port 224 of the valve body 84, past the groove in the spool valve 236, and from port 223 into the conduit 240 which leads to the pressure maintaining valve 204, and hence to the reservoir.

*Operation of hydraulic components during coarse feed portion of the operating cycle*

Figure 11:
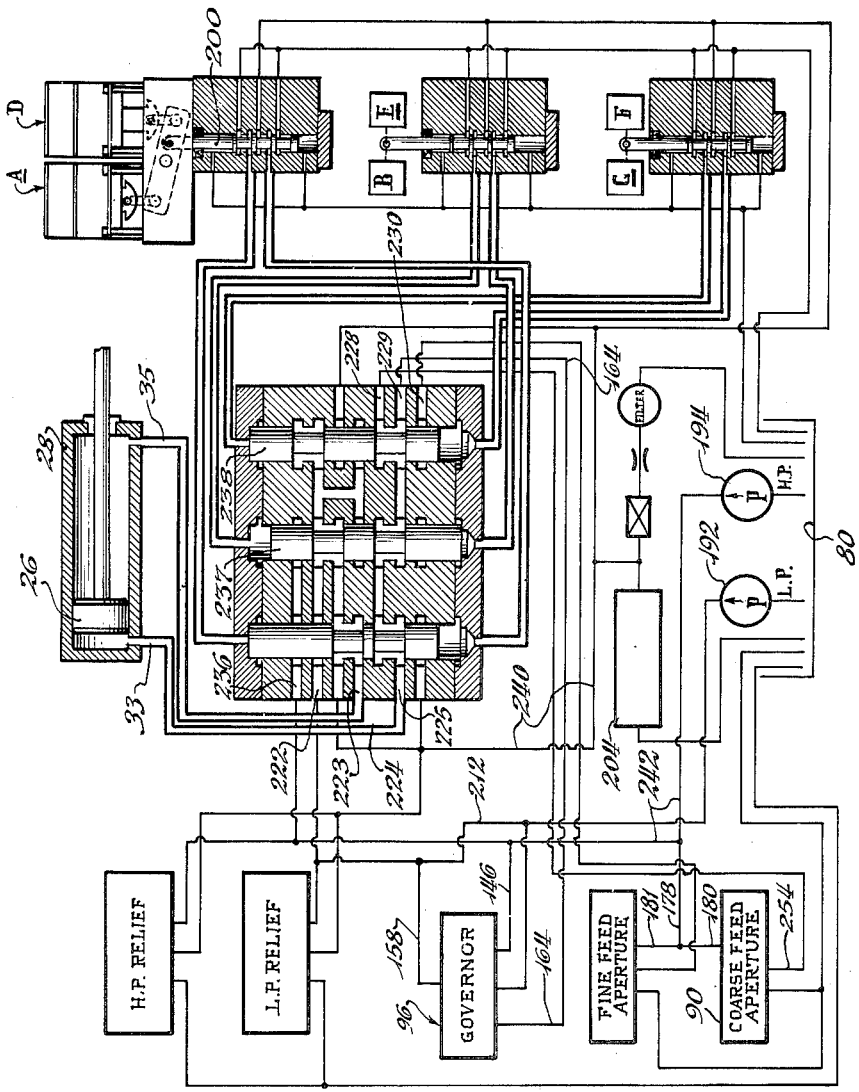
Fig. 11 is a similar view, showing the parts in coarse feed forward position.

When the tool carrying head 24 is to be moved in the coarse feed portion of the cycle, solenoids A, E, and C are energized, as indicated in Fig. 11. The pilot valves 200 and 202 remain in their lower position, while the pilot valve 201 is raised to its upper position. By following the pilot valve hydraulic circuits, it will be clear that under these conditions spool valves 236 and 238 will remain in their upper position, while the spool valve 237 will be moved to its lower position.

With the spool valves in these positions, the discharge from the high pressure pump is fed through conduit 242 and a branch conduit 146 to the governor valve 96. The surplus oil discharged through the governor valve flows through passageway 158, joins the discharge of the low pressure pump in conduit 212, flows to port 222, around spool valves 236 and 237, then through conduit 240 to the pressure maintaining valve 204.

The useful discharge from the high pressure pump 194 is supplied through conduit 242, passageway 178, and branch passageway 181 to the coarse feed aperture valve 90 from which it is discharged through a passageway 254 which leads to port 228, thence past the three spool valves to port 225 which is connected by pipe 33, to the head end of the cylinder 28.

The oil compressed in the rod end of the cylinder 28 flows through conduit 35 to the port 224, then past the spool valve 236, port 223, conduit 240, to pressure maintaining valve 204.

The piston is thus advanced at a coarse feed rate determined by the setting of the coarse feed aperture valve 90. The governor valve 96 maintains a constant flow of oil through aperture 188 of the coarse feed aperture valve 90 regardless of hydraulic pressure fluctuations in the head end of motor cylinder 28. There is no flow through the fine feed aperture valve because the port 230 is blocked by the spool valve 238.

It will be noted that port 228 which, during this portion of the cycle is connected to the head end of cylinder 28, is also connected to port 229 around spool valve 238, and that the port 229 is connected by conduit 164 to the upper end of the bore 144 (Fig. 7) in which the governor valve is located, so as to transmit the pressure at the head end of the cylinder on the upper end of the governor spool valve 142. A constant differential pressure across the coarse feed aperture 188 is thus maintained. This pressure will be equal to the pressure necessary to compress the spring 162 of the governor valve, approximately 40 p. s. i.

*Operation of the hydraulic components during the fine feed portion of an operating cycle*

During the fine feed portion of an operating cycle, as, for example, when in addition to performing a drilling operation, the head contains tools for facing or chamfering, the fine feed dogs 44 (Fig. 1) would be positioned at a point such that it would operate its limit switch 54 at the time the facing or chamfering operation is to be commenced. Through the electric controls hereinafter described, solenoids A, E, and F are energized, the pilot valve 200 thus remains in its lowered position (Fig. 12), the pilot valve 201 remains in its upper position, and the pilot valve 202 is raised to its upper position. As a result, spool valve 238 is moved to its lower position, the other spool valves 236 and 237 remaining in the positions they occupied during the coarse feed portion of the cycle.

With the spool valves in these positions, the low pressure pump discharge flows to the pressure maintaining valve 204 through the same path as was followed during the coarse feed portion of the cycle. The discharge from the high pressure pump 194 is conducted through conduit 242, passageway 178 and branch passageway 181 to the fine feed aperture valve 92, and after flowing through the aperture in this valve, flows through a conduit 256 to the port 230, around spool valves 238, 237, and 236, to port 225, and through pipe 33 to the head end of motor cylinder 28.

The oil is discharged from the rod end of cylinder 28 through pipe 35, to port 224, around the spool valve 236, port 223, and through conduit 240 to the pressure maintaining valve 204.

The governor valve operates the same as in the coarse feed portion of the cycle because ports 229 and 230 are in communication around spool valve 233, and conduits 256 and 164 are thereby connected.

*Operation of hydraulic components during rapid reverse portion of an operating cycle*

Figure 13:
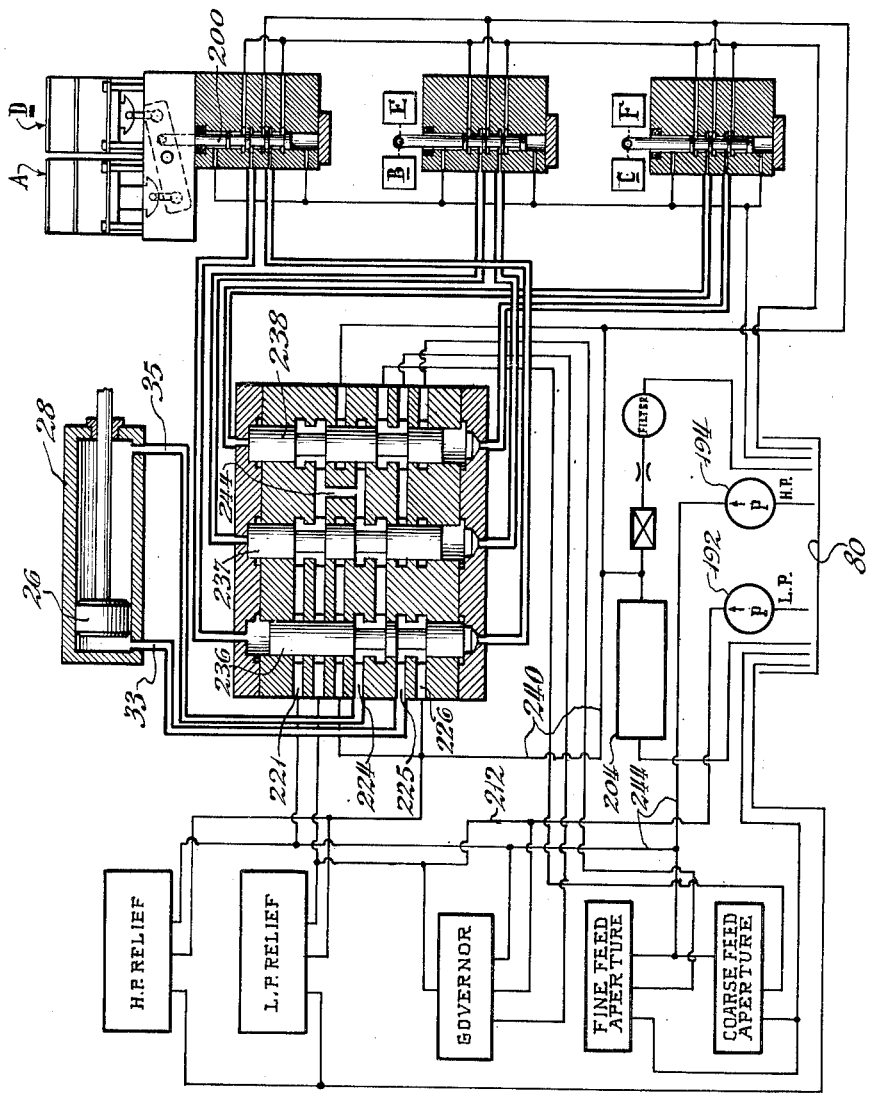
Fig. 13 is a similar view, showing the parts in rapid reverse position.

Upon completion of the cutting operation upon the work piece, it is desired to withdraw the tools rapidly from the work. This is accomplished, as illustrated in Fig. 13, by energization of solenoids D, B, and C, raising pilot valve 200, and lowering pilot valves 201 and 202. With the spool valves 236, 237, and 238 in these positions, the discharge of both the high and low pressure pumps is supplied to the rod end of the cylinder 28. The discharge from the low pressure pump flows through conduit 212 to port 222, around spool valves 236 and 237, vertical passageway 244, again around spools 237 and 236, to port 224, and through pipe 35 to the rod end of cylinder 28.

The discharge from the high pressure pump 194 flows through conduit 244 to port 221, around the spool valves 236 and 237, there joining the flow from the low pressure pump, through the vertical passageway 244, around spools 237 and 236 to port 244, and through pipe 35 to the rod end of the cylinder 28. The combined discharge of both the low and high pressure pumps is thus utilized to effect rapid return of the head to its stop position.

The oil at the head end of the cylinder 28 flows through pipe 35 to port 225, around spool valve 236, through port 226, and through conduit 240 to the pressure maintaining valve 204. The rapid reverse traverse continues until the appropriate dog operates a limit switch which causes energization of solenoids D, B, and F, to cause the pilot valves 200, 201, and 202 to resume the positions in which they are shown in Fig. 9, whereupon both ends of the motor cylinder 28 will contain oil under the same relatively low pressure, a pressure insufficient to move the head against the forces of gravity and friction.

*Operation of hydraulic components during a coarse feed reverse portion of an operating cycle*

Figure 14:
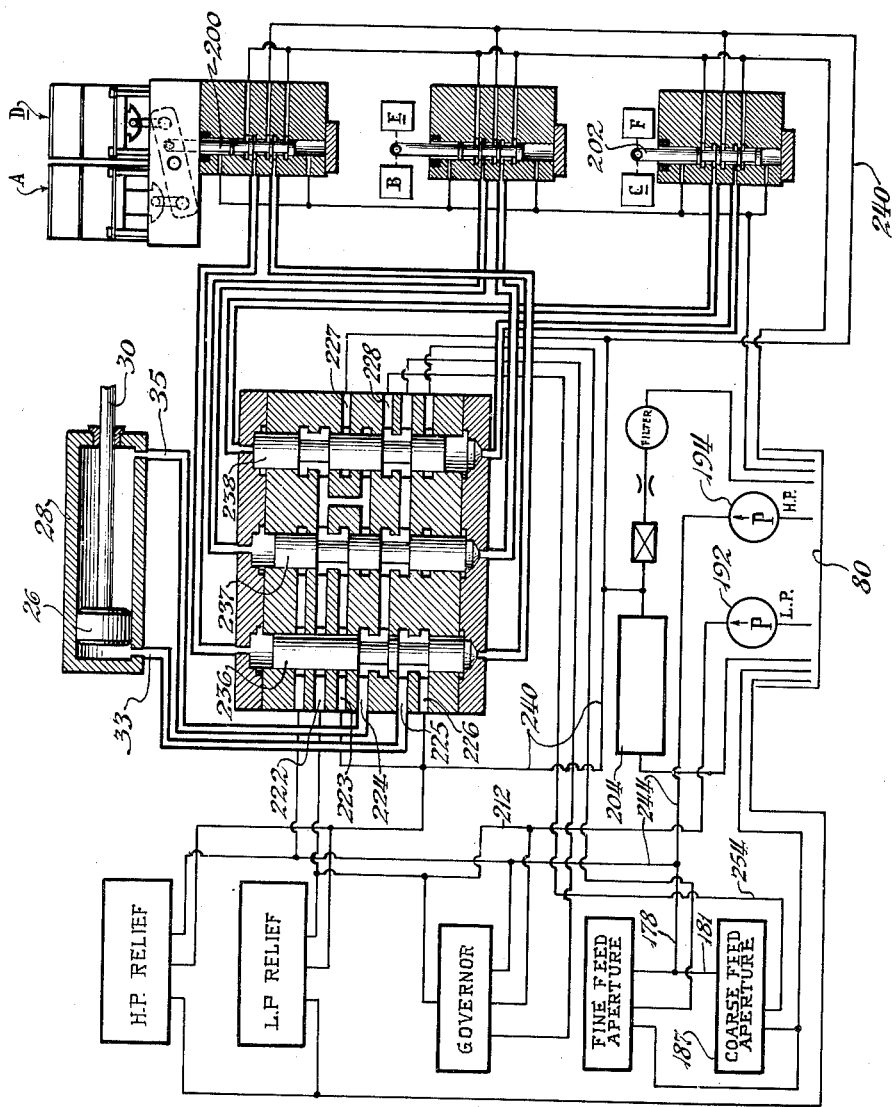
Fig. 14 is a similar view, showing the parts in coarse feed reverse position.

Under some circumstances, such as in tapping operations, it is desirable that the head 24 be reversed at a coarse feed rate. This is accomplished by energizing solenoids D, E, and C, moving the pilot valves 200, 201, and 202 to the positions in which they are shown in Fig. 14, thus applying the oil pressure at which it is maintained by the valve 204 to the upper ends of spool valves 236 and 237, and to the lower end of spool valve 238. Under these circumstances, the discharge of the low pressure pump 192 is not usefully employed, but flows through conduit 212 to port 222, around spool valves 236 and 237, to port 223, and through conduit 240 to the pressure maintaining valve 204.

The discharge from the high pressure pump 195 is supplied through conduits 244 and 178, branch conduit 181 to the coarse feed aperture valve 187, conduit 254, to port 228, around all three spool valves, to port 224, and thence through conduit 256 to the rod end of the cylinder 28. The oil is discharged from the head end of this cylinder through the pipe 33 to the port 225, around spool valve 236, to port 226, and hence via conduit 240 to the pressure maintaining valve 204.

*Operation of hydraulic components during the fine feed reverse portion of a cycle*

Figure 15:
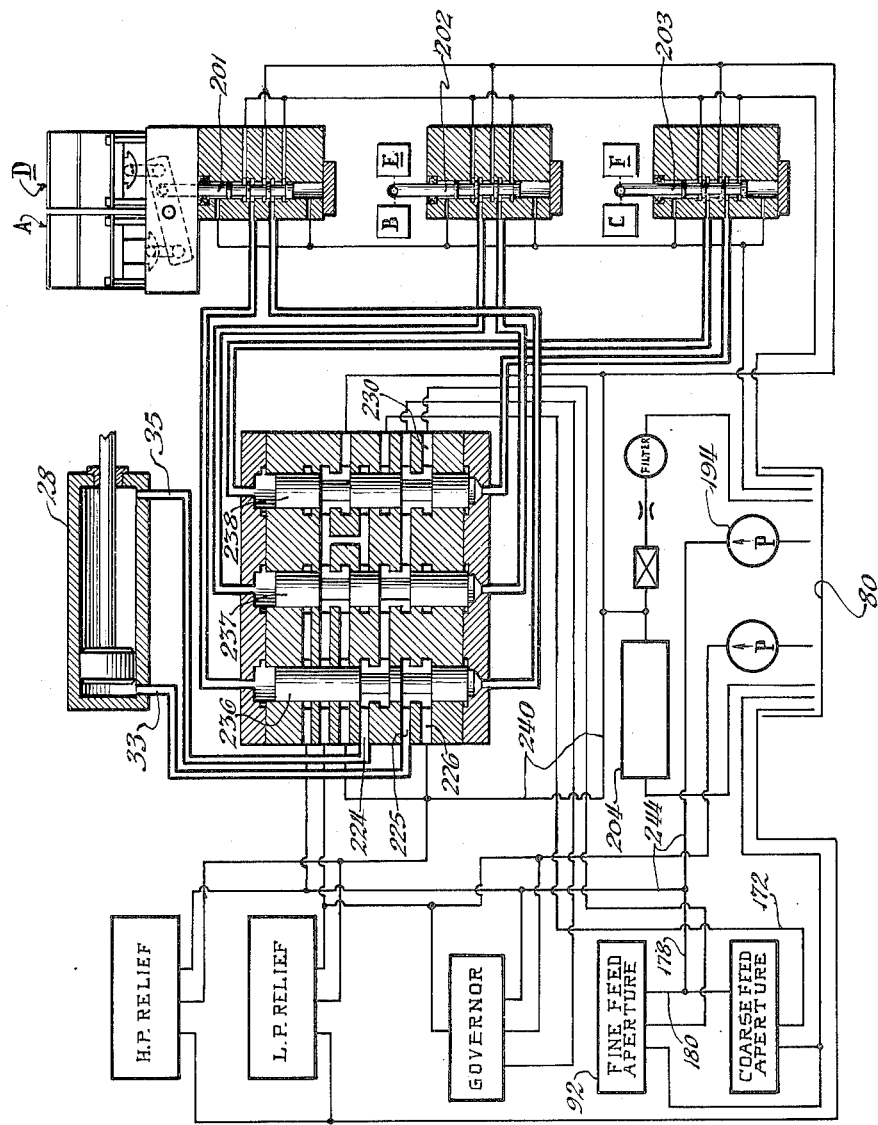
Fig. 15 is a similar view, showing the parts in fine feed reverse position.

In machining some parts, as, for example, when it is required to finish a downwardly facing surface, the spindle may extend through the work or through a part thereof, and a facing tool secured to the spindle. Then, possibly after a coarse feed reverse portion of the cycle, the tool carrying head 22 must be moved upwardly (reverse) at a fine feed rate. Under these circumstances, solenoids D, E, and F are energized to move the pilot valves 200, 201, and 202 to the positions in which they are shown in Fig. 15, thereby causing the spool valves 236, 237, and 238 to be moved to their lower positions. When in this position, the discharge of the low pressure pump is not usefully employed, and flows through the path previously described in connection with the coarse feed reverse portion of the cycle.

The discharge of the high pressure pump 194 flows through passageways 244 and 178 (Fig. 8), and branch passageway 180 to the fine feed aperture valve 170. After passing through the orifice provided by the V-shaped groove 175, adjusted to secure the desired fine feed rate, the oil flows through passageways 176 and 172 to port 230 (Fig. 15), around the three spool valves, to port 224 and conduit 35, to the rod end of motor cylinder 228, the oil from the head end of this cylinder being discharged through conduit 33 to port 225, around spool valve 236, and through port 226 and conduit 240 to the pressure maintaining valve 204.

*A variety of different cycles may readily be performed*

From the foregoing, it will appear that by proper energization of certain combinations of the solenoids A to F in sequence, the machine tool head may be caused to move toward and away from the work in any desired sequence of speeds, and the point at which the direction or speed of movement is to be changed may readily be set by properly positioning the dogs 52 to 56 and 71 to 75 (Figs. 1 and 2).

Typical cycle movements are: Manual start, rapid forward, coarse or fine feed, automatic reverse, and rapid reverse to automatic stop; manual start, rapid forward, coarse feed, fine feed, automatic reverse with dwell, if required, rapid reverse to automatic stop; manual start, rapid forward, feed forward, automatic reverse, feed reverse, rapid reverse to automatic stop; and manual start, rapid forward, fine or coarse feed forward, rapid forward, fine or coarse feed forward, automatic reverse, rapid reverse to automatic stop.

*Operation of hydraulic components of modified form of the invention, in which the spool valves are actuated directly by the solenoids*

In adapting the control apparatus to smaller machines requiring lesser volume of hydraulic fluid for their operation, it is more economical to operate each of the spool valves directly by means of a pair of solenoids. Such arrangement is shown in Fig. 17, wherein spool valves 276, 277, and 278 are operated by pairs of solenoids. The spool valve 278 is operated by solenoids K and L in the same manner that the pilot valves are operated in the previously described embodiment shown in Figs. 9 to 16.

The spool valve 276 is similarly operated by solenoids G and H (shown diagrammatically in Fig. 17) and the spool valve 277 is operated by solenoids I and J. The spool valves 276, 277, and 278 are similar to the spool valves 236, 237, and 238, shown in Fig. 9, and other figures, except that they are of smaller diameter and are provided with longitudinally drilled holes 280 and transfer passageways 281 for collecting oil which may leak past the valves. These valves are mounted in suitably grooved bores 282 formed in a valve block 284. In this embodiment, the ends of the bores 282 are closed by the caps 86, each of which is connected to a conduit 286 leading to the reservoir.

In this embodiment of the invention, the solenoids G and H in their functions correspond to the solenoids D and A, respectively, in the previously described embodiment; solenoids I and J correspond to solenoids E and B, and solenoids K and L correspond to solenoids F and C. Thus the schematic wiring diagram of Fig. 16 may be applied to the valve structure of Fig. 17 without in any respect changing the functions of the controls. The remaining parts of the hydraulic system shown in Fig. 17 may be identical with those previously described, and corresponding reference characters have therefore been applied to similar parts, and a detailed description thereof will not be repeated. Except for the omission of the pilot valves, the operation of the hydraulic system of Fig. 17 is the same as that of the previously described embodiment.

Figure 18:
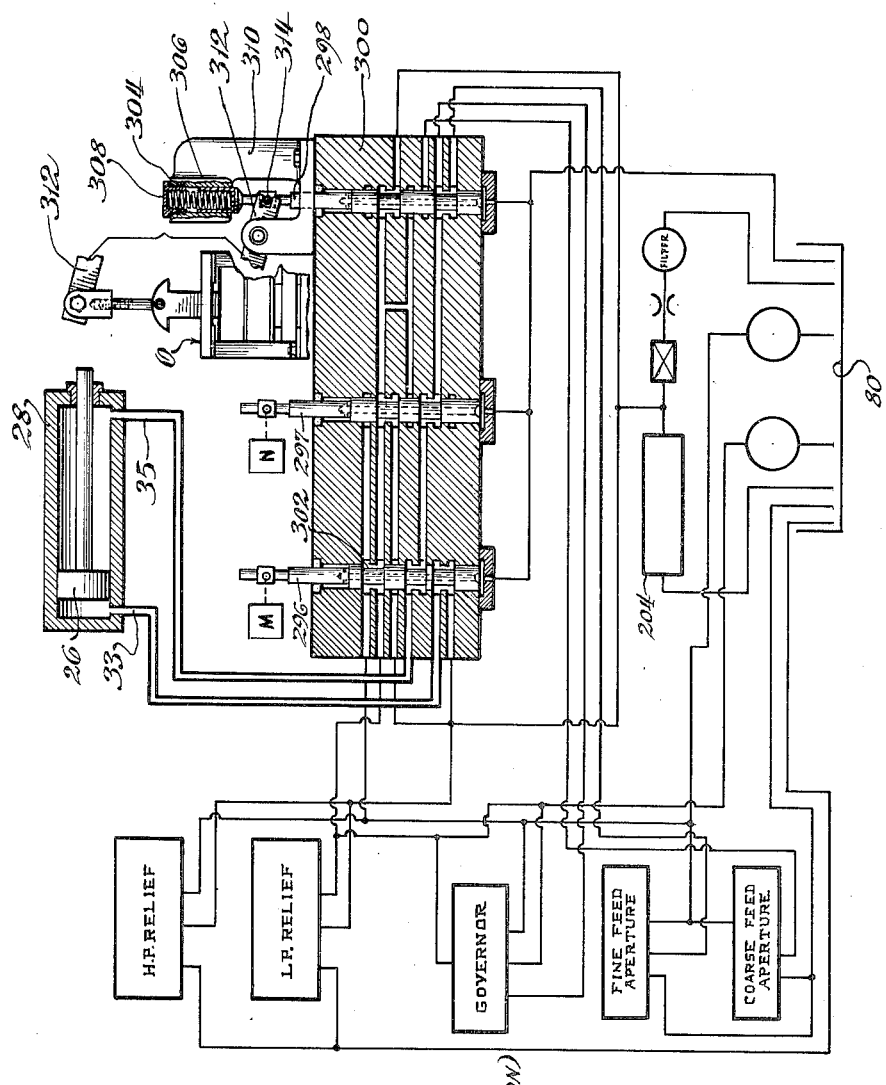
Fig. 18 is a similar diagram of a further modification of the invention.

*The modification shown in Fig. 18*

In small machine tools, a further saving may be effected by eliminating three solenoids. As shown in Fig. 18, spool valves 296, 297, and 298 are reciprocable in a valve body 300. Spool valves 297 and 298 are similar to the spool valves 277 and 278, but the spool valve 296 differs from the spool valve 276 in that it has an additional groove 302. In this embodiment of the invention, each of the spool valves is normally held in its lowermost position by a compressed coil spring 304 confined in a hollow sleeve 306, the bottom of which presses against the end of the stem of valve 298. The sleeve is slidable in bracket 310. The other end of the spring abuts against a hollow cap 208 threaded in bracket 310 suitably secured to the valve body 300. The plunger of a solenoid O is pivotally connected to a lever 312 which is pivoted on the bracket 310. The other end of lever 312 is yoke-shaped to engage with a cross pin 314 secured to the stem of the spool valve 298. The spool valves 296 and 297 are similarly operated by solenoids M and N, which are diagrammatically shown as blocks in Fig. 18.

Due to the addition of the groove 302 in the spool valve 296, the tool carrying head is in stop position when the spools 296, 297, and 298 are in their lower position. (In the embodiment of the invention shown in Figs. 1–16, all of the spools are in their lower positions in the fine feed portion of the cycle—Fig. 15). Thus, in the event of failure of electric current, the springs 304 will move the spool valves M, N, and O to their lower positions, and the tool carrying head will stop movement.

In the rapid forward portion of the cycle, solenoids M, N, and O, are energized.

In the coarse feed portion of the cycle, solenoids M and O only are energized, that is, the solenoid N is deenergized in going from rapid forward to the coarse feed portion of the cycle.

In the fine feed portion of the cycle, only solenoid M is energized, that is, in going from coarse feed to fine feed the solenoid O is deenergized.

In going from fine feed to rapid reverse, solenoids N and O are energized and solenoid M is deenergized. Upon completion of the rapid reverse portion of the cycle, all of the solenoids are deenergized and the spool valves returned to their lower positions, as shown in Fig. 18.

In using this embodiment of the invention, it is not possible to have machine operating cycles which incorporate feeds in the reverse direction. By comparison with the operating cycles described with reference to Figs. 9 to 13, it is believed that the operation of the embodiment shown in Fig. 18 will be readily apparent.

It may be noted that there are eight possible combinations of positions of the three spool valves. As above noted, only four combinations of spool valve positions are utilized, namely, rapid forward, coarse feed, fine feed, and reverse. In the remaining four possible combinations of the positions of these spool valves, both ends of the motor cylinder 28 will be at the pressure determined by the pressure retaining valve 204, that is, the tool carrying head 24 will be in its stop position. Since all of the solenoids must be energized in order to position the spool valves for rapid forward movement of the tool carrying head, it is apparent that the failure of any one of the solenoids to operate will not result in rapid forward traverse of the head, and thus the possibility of breakage of tools due to misoperation of the solenoids is greatly lessened.

If desired, the three pilot valves 200, 201, and 202 of the embodiment of the invention shown in Figs. 1 to 16, may be operated in one direction by a solenoid and in the other direction by a spring, in the manner in which the spool valves of Fig. 18 are operated. For example, if in Fig. 9 a spring be substituted for each of the solenoids D, E, and F, and if a groove, such as groove 302 (Fig. 18) of the spool valve 296 were cut in the valve 236 of Fig. 9, none of the solenoids would be energized in the stop position. In the rapid forward portion of the cycle, all three solenoids A, B, and C are energized; in the coarse feed portion of the cycle, solenoids A and C are energized; in the fine feed forward portion of the cycle, solenoid A only is energized, and in the rapid reverse portion of the cycle, solenoids B and C are energized. Thus the control system for machines requiring a greater volume of oil may be controlled by the operation of three solenoids and the electrical control circuits may be like those shown in Fig. 19.

*Hydraulic components accessible*

In all embodiments of the invention, the spool valves are readily accessible merely by the removal of end cap plates 86 (Fig. 3), and in the embodiments of the invention employing pilot valves, these are readily accessible by removal of end cap plates 85 and disconnecting the valve stems from the solenoid operated lever.

The valve bodies 84 and 84', as well as the valve bodies 284 and 300 of the modification, are mounted upon the manifold plates 76, being clamped thereto by readily detachable means so that the valve bodies as a whole, together with the valves, may be removed, it being noted that the ends of the bores in which the fluid under pressure flows at one time or another, such as the bores for the high and low pressure relief valves, the governor valve, and the fine and coarse feed apertures valves, are provided with self-sealing flanged rings of suitable plastic rubberlike material so that the bores are securely sealed against the top surface of the manifold plate by the mere operation of clamping the valve bodies to the manifold plate.

The manifold plate 76 has its vent passageways in alignment with holes in the top plate 78 of the reservoir so that the return of the hydraulic fluid to the reservoir is accomplished without the necessity of making any pipe connections.

By the use of a manifold plate, the necessity of piping and tubing is completely avoided, except for the pipe connections between the valve body and the hydraulic motor cylinder 28. Thus the control may be set up as a unit spaced from the machine tool, further facilitating manufacture, inspection, and servicing of the controls.

Figure 19:
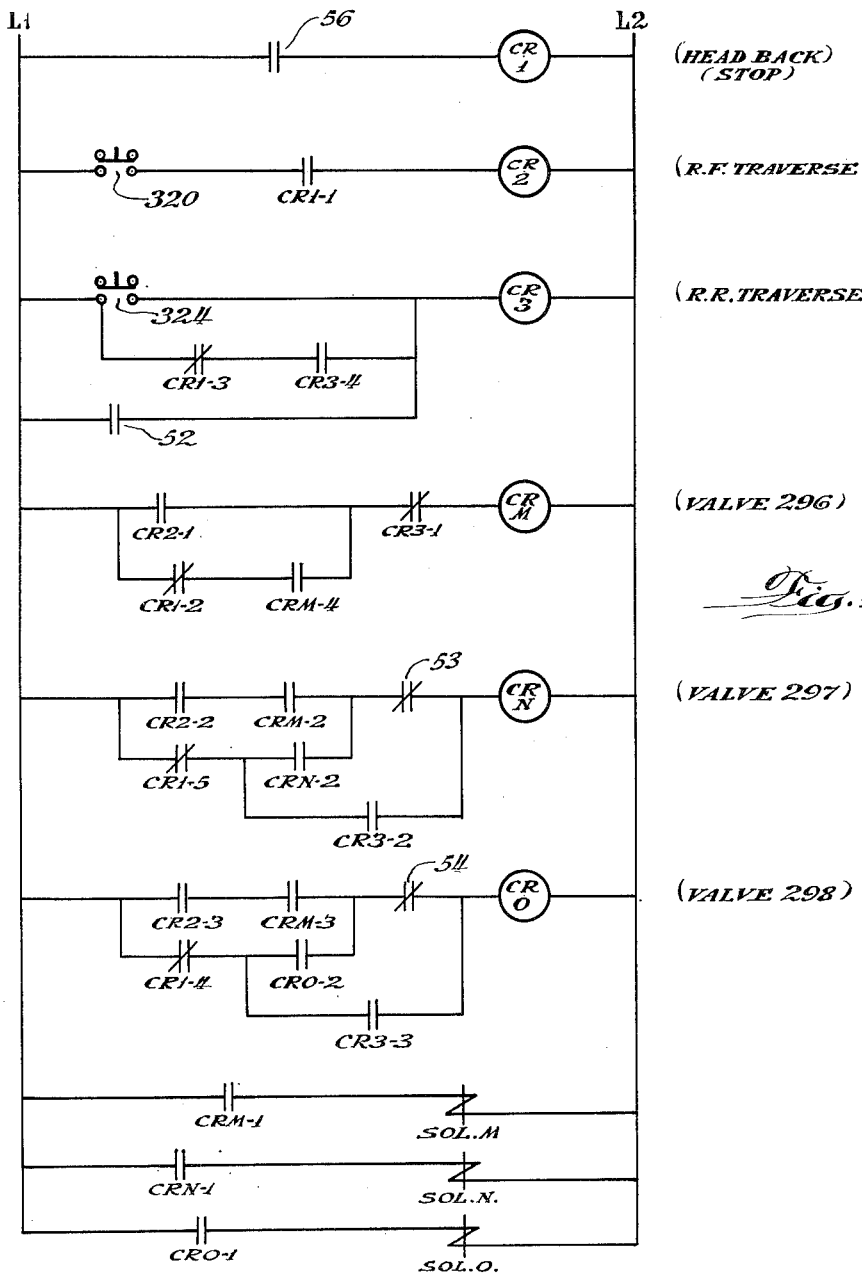
Fig. 19 is a schematic electrical circuit diagram employed with the hydraulic system shown in Fig. 18.

For the sake of economy, the pilot valves 200, 201, 202 of Fig. 9 could be positioned by one solenoid operating against a return spring, employing the control circuit of Fig. 19.

*Electrical control circuits for the embodiment of the invention shown in Fig. 18*

A simplified diagram of the electrical control circuits for the embodiment shown in Fig. 18, is shown in Fig. 19. In this diagram the motor control circuits with their safety relays, etc., have been omitted.

Lines L1 and L2 are connected to a current source whenever the machine is rendered operative, that is, when the head motor 34 is energized, as well as the various other motors for driving the high and low pressure pumps and the coolant pump.

To initiate a cycle of rapid forward, coarse feed, fine feed, and rapid reverse, and stop, a push button is operated to close a switch 320. When the head 24 is in its up or stop position, limit switch 56 is closed, and therefore control relay CR1 is energized and its switch CR1–1 is closed. Thus, closing the push button operated switch 320 completes a circuit to energize CR2, thereby closing its contactors CR2-1, the latter completing a circuit from L1 through normally closed contacts CR3-1 and the coil of relay CRM. The push button operated switch 320 must be held closed a sufficient length of time to permit switch 56 to open and thereby deenergize relay CR1. Energization of relay CRM closes contactors CRM-1, thereby completing a circuit to solenoid M. Energization of CRM also results in completing a circuit from L1 through now closed contacts CR2-2, and CRM-2, normally closed limit switch 53, and the coil of relay CRN.

Energization of relay CRN results in closure of its contacts CRN-1 and thus completes a circuit through solenoid N.

Energization of relay CRM also completes a circuit from L1 through contacts CR2-3, contacts CRM-3, normally closed switch 54, and the coil of control relay CRO.

Energization of relay CRO results in closure of its contacts CRO-1, thereby completing a circuit to the solenoid O.

Energization of relay CRM completes a holding circuit in parallel with contactor CR2-1, and comprising contactors CR1-2 and CRM-4.

Relay CRN has a holding circuit which may be traced as follows: From line L1 through normally closed contactor CR1-5 and now closed contactor CRN-2, limit switch 53, and the coil of relay CRN to line L2.

Relay CRO is also provided with a holding circuit traced as follows: From L1 through CR1-4, now closed contactor CRO-2, normally closed switch 54, and the coil of relay CRO to line L2.

When the rapid forward traverse has been completed, the dog 43 (Fig. 1) will open limit switch 53, thereby deenergizing relay CRN and by opening its contacts CRN-1, solenoid N will be deenergized. Thus valves 296 and 298 will remain in their upper position, and valve 297 will be forced to its lower position by its spring 304 and the valves will thus be in the proper position to effect coarse feed.

When the coarse feed forward portion of the cycle has been completed, limit switch 54 will be opened to deenergize relay CRO, opening its contacts CRO-1 to deenergize solenoid O, the solenoid M remaining energized. Thus, valve 296 will be held in its upper position by its energized solenoid M, while valves 297 and 298 will be held in their lower positions by their springs 304 and the fine feed portion of the operating cycle will commence.

Upon completion of the fine feed portion of the cycle, the limit switch 52 will be closed by its dog 42, thus energizing relay CR3. Contactors CR3-1 will therefore open, deenergizing relay CRM; consequently by opening its contact CRM-1, deenergizing solenoid M, permitting valve 296 to be forced to its lower position by its spring. Energization of relay CR3 will also result in closing its contacts CR3-2 and complete a circuit to energize relay CRN through a circuit traced from L1 through normally closed contactor CR1-5, contactor CR3-2, and control relay CRN. CRN being energized, its contactor CRN-1 will be closed and solenoid N energized to raise valve 297.

Energization of relay CR3 will also result in closure of its contacts CR3-3, thereby completing a circuit to control relay CRO, traced as follows: From L1, through normally closed contactor CR1-4, contactor CR3-3, and relay CRO. Energization of the latter relay results in closure of its contacts CRO-1 and consequent energization of solenoid O. Valves 297 and 298 will therefore be held in their upper positions, while valve 296 will be held in its lower position by its spring, and the valves will thus be in proper position to cause a rapid reverse movement of the head 24.

It will be noted that the relay CR3 will be maintained in its energized state by virtue of a holding circuit which may be traced as follows: Line L1, contactor CR1-3, contactor CR3-4, and the coil of relay CR3 to line L2.

Relay CRN has a holding circuit which may be traced as follows: From line L1, contactors CR1-5, CRN-2, normally closed limit switch 53, and through the coil of relay CRN to line L2.

Similarly, the relay CRO has a holding circuit traced as follows: From L1, contactor CR1-4 and CRO-2, normally closed limit switch 54, coil of relay CRO, to line L2.

Upon completion of its reverse traverse, limit switch 56 is closed, thereby energizing relay CR1, thus opening its normally closed contacts CR1-1, CR1-2, CR1-3, CR1-4, and CR1-5. Closure of contactor CR1-1 conditions the circuit for relay CR2 to be completed upon closure of the switch 320, and opens the holding circuits for relays CR3, CRM, CRN, and CRO. Deenergization of the last three relays results in opening their switches CRM-1, CRN-1, and CRO-1, to deenergize the solenoids M, N, and O, assuring that the three valves 296, 297, and 298 will be moved to their lower positions by their respective springs 304, in which position the oil pressure on the opposite ends of the motor cylinder 28 will be the same, that is, at a pressure determined by the pressure maintaining valve 204, and the head will come to rest.

In an emergency, as, for example, upon breakage of a tool, the head 24 may be rapidly reversed from any position in which it may be, to its stop position, by closure of a push button operated switch 324. It will be noted that this switch is in parallel with the limit switch 52, and therefore has the same effect on the control circuits, with the ultimate result of deenergizing the solenoids M, N, and O.

*Electrical control circuits for the embodiments of the invention shown in Figs. 1–15 and 17*

Figure 16:
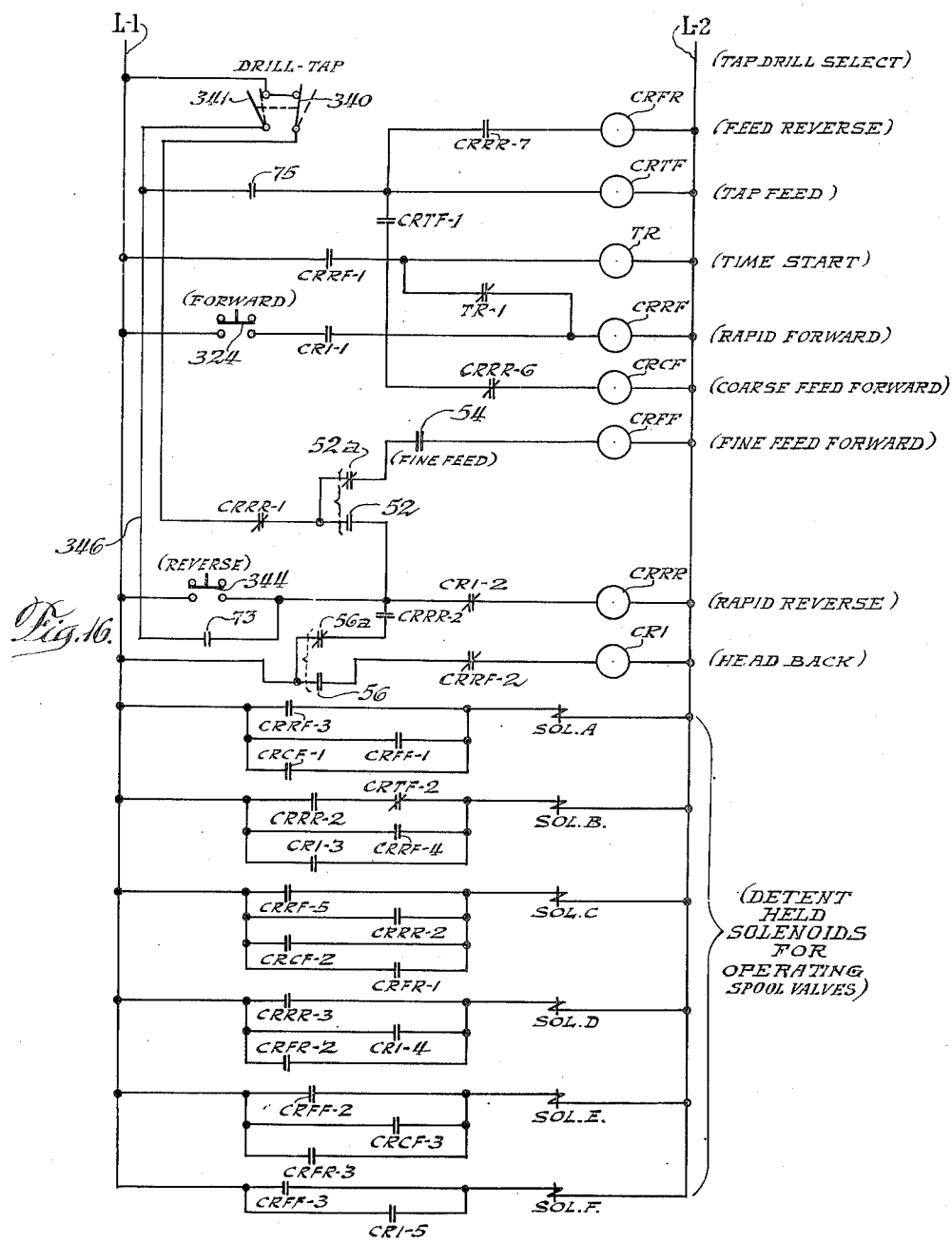
Fig. 16 is a schematic electrical circuit diagram of the electrical controls.
Figure 17:
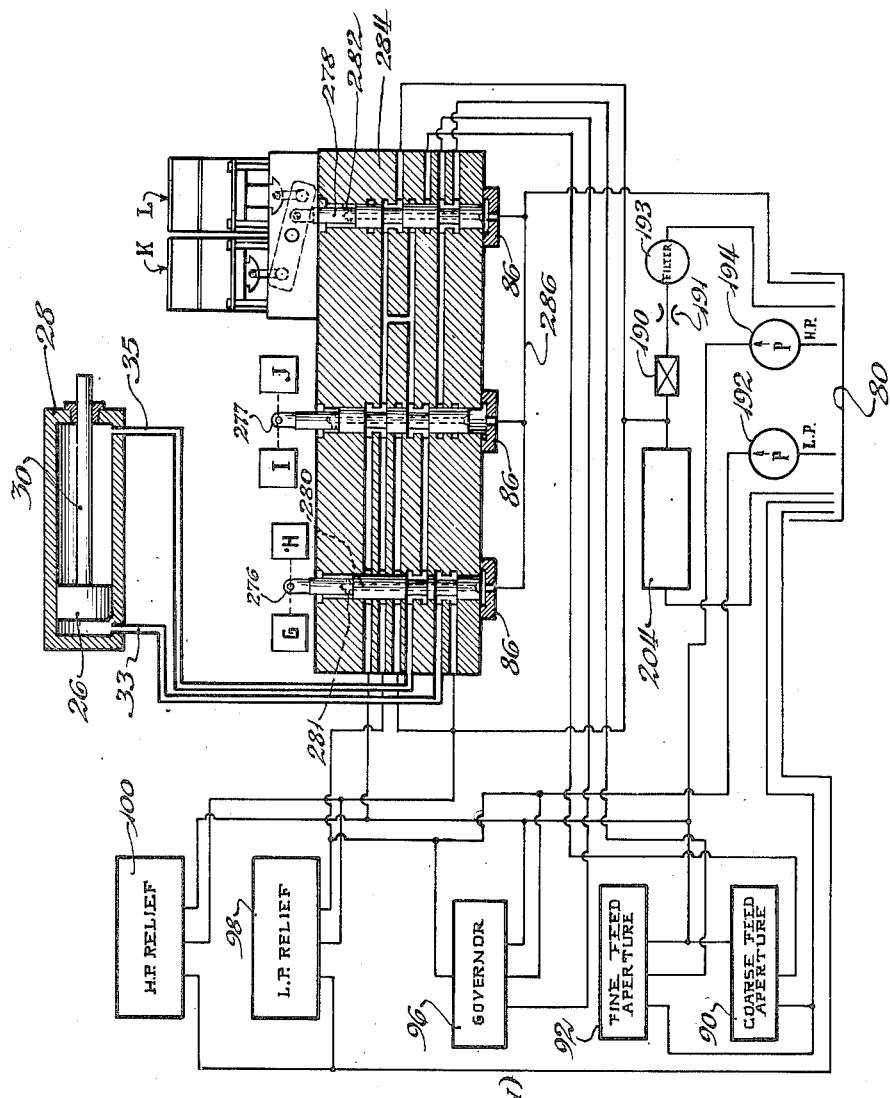
Fig. 17 is a schematic diagram of the hydraulic components of a modified form of the invention.

Fig. 16 shows a simplified diagram for the electrical control circuits for the embodiment of Figs. 1–15. This circuit will be described first as it operates when the machine is performing a drilling operation. In the reference characters used on the relays and their contactors, "CR" means "control relay"; "RF" means "rapid forward"; "CF" means "coarse feed"; "FF" means "fine feed"; "RR" means "rapid reverse"; "TF" means "tap feed," and "FR" means "feed reverse."

It will be assumed at the start that the head 24 is in its upper or back position, and that the limit switch 56 is closed so that relay CR1 is energized. The switch 56a is mechanically connected to a switch 56 so as to open when the latter closes, and vice versa. It will also be assumed that solenoids B, D, and F have been energized, and that the hydraulic valves are therefore in the position shown in Fig. 9. The "drill-tap" selector switches 340, 341 are assumed to be in the positions shown in full lines, namely, in "drill" position.

Figure 12:
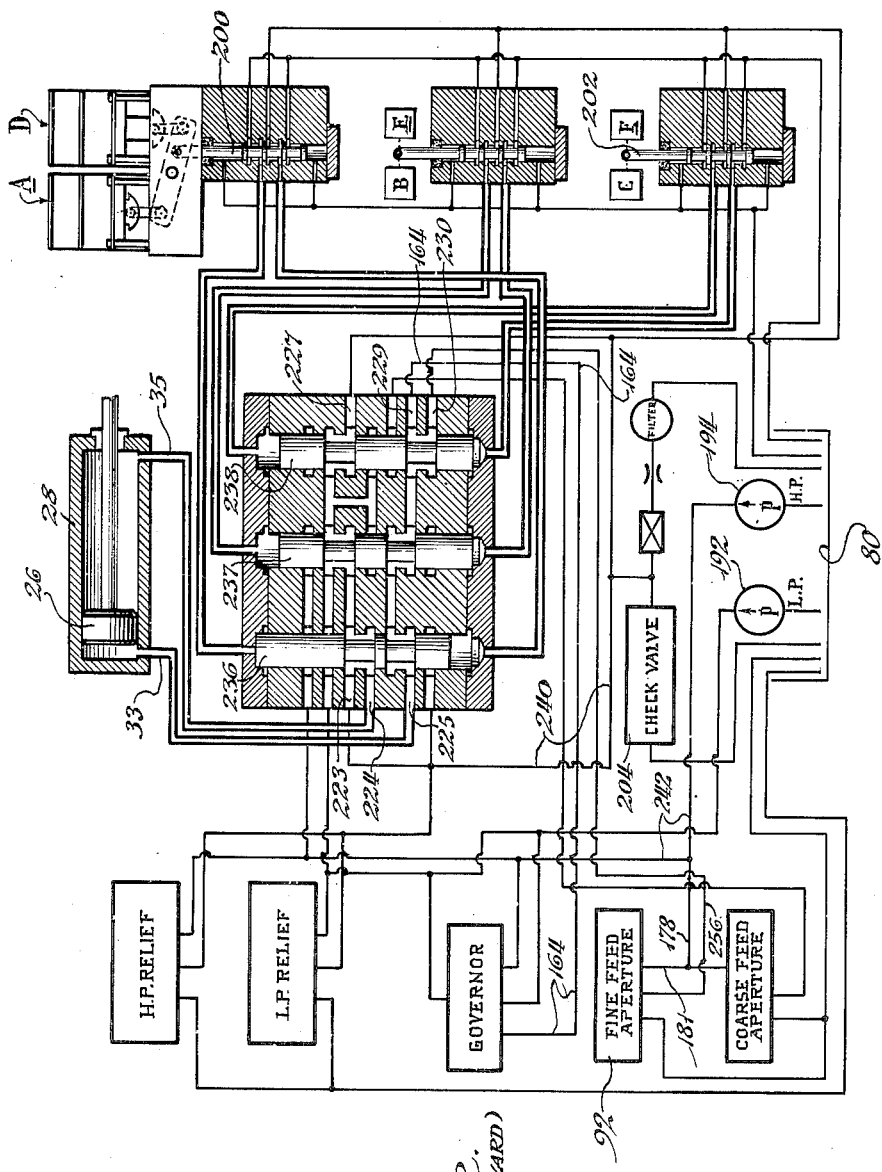
Fig. 12 is a view showing the parts in fine feed forward position.

Upon depression of the forward push button, switch 324 is momentarily closed, thereby completing a circuit from L1 through switch 324, the now closed contacts CRI-I, through the coil of of relay CRRF to line L2. Energization of this relay closes its contactor CRRF-I, thereby establishing a holding circuit traced from LI through CRRF-I, normally closed contacts TR-I, and relay CRRF to line L2. In addition, the opening of its contactor CRRF-2 deenergizes relay CRI. Closure of CRRF-I also results in supplying current to a time delay relay TR. After approximately two seconds, this relay will open its contacts TR-I. This allows time for the head to move sufficiently to open the limit switch 56 and close switch 56a. Energization of relay CRRF also results in closure of its contactors CRRF-3, CRRF-4, and CRRF-5. It will be noted that the latter contactors are connected between the lines LI and L2, respectively, in series with solenoids A, B, and C. As a result of the energization of these relays, the valves will be moved to the positions shown in Fig. 10, namely, in the rapid forward positions, as previously described. The head then moves downwardly to the position where fine feed is to be commenced, whereupon limit switch 54 is closed to energize relay CRRF. The circuit for energizing this relay may be traced from line LI, "drill" switch 340, contactor CRRR-I, switch 52a, limit switch 54, and through the coil of relay CRRF to line L2. This results in closure of contactors CRFF-I, CRFF-2, and CRFF-3, thereby completing circuits to energize solenoids A, E, and F, respectively. As a result, the valves are moved to their fine feed forward position as shown in Fig. 12.

The unit feeds forwardly to the end of its downward stroke when limit switch 52 is closed. This limit switch is mechanically connected to a normally closed switch 52a in the circuit through which the relay CRFF is energized, and the latter relay is therefore deenergized when the limit switch 52, 52a is operated. Closure of switch 52 results in energization of relay CRRR and the latter relay locks closed until the unit returns to the back position by virtue of a circuit which may be traced from LI through limit switch 56a, contactors CRRR-2, and CRI-2.

As the head 24 completes its upward stroke, limit switch 56 is closed and 56a opened so that relay CRI is energized and CRRR deenergized. The contactors CRI-3, CRI-4, and CRI-5 will therefore complete circuits to energize solenoids B, D, and F, respectively, and the valves will be restored to the positions in which they are shown in Fig. 9.

In an emergency, a push button operated switch 344 may be closed to complete a circuit traced as follows: From line LI, through switch 344, contactor CRI-2, and relay CRRR, to line L2. Energization of this relay causes energization of solenoids B, C, and D to move the valves to the positions shown in Fig. 13, and the head will move in rapid reverse to its stop position.

The operation of the control circuits during a tapping cycle will now be described, assuming that the head is in its stop position, limit switch 56 is closed, CRI is energized, and that the valves are in the positions shown in Fig. 9. The selector switches 340 and 341 are moved to their dotted line positions, thereby connecting a conductor 346 to line LI. The forward pushbutton is depressed momentarily to close switch 324. This causes rapid forward traverse of the head in the same manner as in the drilling cycle, until the coarse feed for the tapping operation is to commence, whereupon dog operated limit switch 74 is closed. This switch is held closed throughout the actual tapping portion of the cycle and while the taps are being withdrawn from the work.

Closure of switch 74 energizes tap feed relay CRTF and the contactor CRTF-I close to complete a circuit traced as follows: From LI, through switch 341, conductor 346, switch 75, contactors CRTF-I and CRRR-6, and coarse feed relay CRCF to line L2. Contactors CRCF-I, CRCF-2, and CRCF-3 are thus closed to complete circuits to solenoids A, C, and E, respectively, and the latter move the valves to the positions shown in Fig. 11. The head continues moving downwardly at the required speed for tapping until the tapping operation has been completed, whereupon a dog closes limit switch 73.

Closure of switch 73 energizes relay CRRR, and its normally closed contactor CRRR-6 opens to deenergize relay CRCF, while its normally open contactor CRRR-7 is closed to complete a circuit to the feed reverse relay CRFR. Closure of contactors CRFR-I, CRFR-2, and CRFR-3 results in energizing solenoids C, D, and E, to position the valves as shown in Fig. 14. Consequently, the head will move in reverse at a coarse feed rate as the taps are being withdrawn from the work piece.

After the taps are clear of the work piece, switch 74 is no longer held open by its operating dog, and opens, thereby deenergizing relays CRFR and CRTF. The opening of contactor CRDF-3 deenergizes solenoid E, while the closing of the normally closed contactor CRTF-2 completes a circuit through solenoid B. Thus solenoids B, C, and D are energized, the valves are moved to the positions shown in Fig. 13 to cause the head to move rapidly in reverse until limit switch 56 is closed and its connected switch 56a opened. Closure of switch 56 energizes relay CRI which by closure of its contactors CRI-3, CRI-4, and CRI-5, completes circuits to solenoids B, D, and F, and the valves will thus be positioned as shown in Fig. 9, and the movement of the head will be stopped, completing the tapping cycles.

By proper adjustment of the dogs 42 to 46 and 61 to 65, the tool head may be made to operate through various other types of cycles, and the feed rates may be adjusted through a wide range by means of the coarse and fine feed valves 90 and 92. The control system is highly flexible for adaptation to different machine tools and for various kinds of operating cycles.

The electrical control system shown in Fig. 16 may be used with the hydraulic system shown in Fig. 17.

To summarize, with the three spool valves each having two effective positions, eight different combinations may be obtained. Since in the particular embodiments of the invention disclosed herein only seven different operating conditions are required, there is one combination which is not necessary, that is, the combination in which solenoids A, E, and F are energized. To make certain that accidental energization of solenoids A, E, and F will have no injurious effect, the passages in the valve block 84 are so arranged that when the spool valves are moved by the energization of these solenoids, hydraulic pressure will not be applied to either end of the motor cylinder, and the head will stop.

The solenoids are provided with detents so that they will require but momentary energization and the valves operated thereby will therefore remain in the position to which they are moved by the energization of the solenoids, except in the embodiment shown in Fig. 18.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a control apparatus for machine tools having a part reciprocated by a hydraulic motor comprising a cylinder and piston reciprocable therein the combination of; a spool valve block having three bores therein; three spool valves reciprocable in said bores respectively; electrical control means, responsive to the position of the part reciprocated by the hydraulic motor, operable to effect the movement of each of the three spool valves to either of two effective positions; said block having passages interconnecting portions of said spool valve bores; a manifold plate secured to the spool valve block and having passages formed therein making sealed connections with passages in the spool valve block; high and low pressure pumps having their outlets connected to passages in the manifold plate; high and low pressure relief valves respectively connected to the last named passages; coarse and fine feed aperture valves and a governor valve connected to other passages in the manifold plate; and a pair of connections for respectively connecting passages in the manifold plate to the opposite ends of the hydraulic motor cylinder.

2. In a control apparatus for machine tools having a part reciprocated by a hydraulic motor comprising a cylinder and piston reciprocable therein the combination of; a spool valve block having three bores therein; three spool valves reciprocable in said bores respectively; solenoids energized in predetermined combinations in response to the position of the part reciprocated by the hydraulic motor and operable to move each of the three spool valves to either of two effective positions; said block having passages interconnecting portions of said spool valve bores; a manifold plate secured to the spool valve block and having passages formed therein making sealed connections with the passages in the spool valve block; high and low pressure pumps having their outlets connected to passages in the manifold plate; high and low pressure relief valves respectively connected to the last named passages; coarse and fine feed aperture valves and a governor valve connected to other passages in the manifold plate; and a pair of connections for respectively connecting passages in the manifold plate to the opposite ends of the hydraulic motor cylinder.

3. In a control apparatus for machine tools having a part reciprocated by a hydraulic motor comprising a cylinder and piston reciprocable therein the combination of; a spool valve block having three bores therein; three spool valves reciprocable in said bores respectively; electrical control means including solenoids, responsive to the position of the part reciprocated by the hydraulic motor and operable to move each of the three spool valves to either of two effective positions; said block having passages interconnecting portions of said spool valve bores; a manifold plate secured to the spool valve block and having passages formed therein making sealed connections with passages in the spool valve block; high and low pressure pumps having their outlets connected to passages in the manifold plate; and a pair of connections for respectively connecting passages in the manifold plate to the opposite ends of the hydraulic motor cylinder.

4. In a control apparatus for machine tools having a part reciprocated by a hydraulic motor comprising a cylinder and piston reciprocable therein the combination of; a spool valve block having three bores therein; three spool valves reciprocable in said bores respectively, each of said spool valves having two effective positions; three pilot valves for controlling the positions of the spool valves; electrical control means, responsive to the position of the part reciprocated by the hydraulic motor, operable through the pilot valves to move each of the three spool valves to either of its two effective positions; said block having passages interconnecting portions of said spool valve bores; a manifold plate secured to the spool valve block and having passages formed therein making sealed connections with passages in the spool valve box; high and low pressure pumps having their outlets connected to passages in the manifold plate; and a pair of passages in the manifold plate for connection respectively to the opposite ends of the hydraulic motor cylinder.

5. A hydraulic and electrical control apparatus for a machine tool having a reciprocable tool carrying head, having a plurality of limit switches and adjustable cams for actuating the switches in response to movement of the head to predetermined positions, and having a hydraulic motor for reciprocating the head; the combination of a hydraulic control assembly comprising a reservoir, a manifold plate mounted on the reservoir, said manifold plate having a plurality of passages therein, a valve block having three bores therein, three spool valves respectively reciprocable in said bores, each of said spool valves having two effective positions, a plurality of passages in said valve block connecting certain portions of the bores and also connecting portions of the bores with passages in the manifold plate; solenoids for controlling the movement of said spool valves; electrical circuits including the limit switches for energizing said solenoids in predetermined combinations depending upon which of said limit switches is actuated; high and low pressure pumps having their outlets connected to passages in said manifold plate; and two passages in said manifold plate for connection respectively to the ends of said hydraulic motor cylinder respectively.

6. A hydraulic and electrical control apparatus for a machine tool having a reciprocable tool carrying head, having a plurality of limit switches and adjustable cams for actuating the switches in response to movement of the head to predetermined positions, and having a hydraulic motor for reciprocating the head, the combination of a valve block having three bores formed therein, three spool valves respectively reciprocable in said bores, each of said spool valves having two effective positions, a plurality of passages in said valve block connecting certain portions of the bores, solenoids for controlling the movement of said spool valves, electrical circuits including the limit switches for energizing said solenoids in predetermined combinations depending upon which of said limit switches is actuated, and means, including two passages in said valve block for connection respectively to the ends of said hydraulic motor cylinder.

7. The combination set forth in claim 6, in which the spool valves are hydraulically operated under the control of pilot valves, and in which the pilot valves are operated by the solenoids.

8. The combination set forth in claim 7, in which each pilot valve is mechanically connected to two solenoids operable to move the pilot valve in opposite directions.

9. In a hydraulic and electrical control apparatus for a machine tool having a reciprocable tool carrying head and having a plurality of limit switches and adjustable cams for actuating the switches in response to movement of the head to predetermined positions, and having a hydraulic motor for reciprocating the head, the combination of a hydraulic control assembly comprising a reservoir having a top with openings therein, a manifold plate mounted on the top of the reservoir, said manifold plate having a plurality of passageways therein some of which are in alignment with the openings in the top of the reservoir, a valve block having bores formed therein, spool valves respectively reciprocable in said bores, a plurality of passages in said valve block connecting certain portions of the bores and also connecting said portions with passages in the manifold plate, solenoids for controlling the positioning of said spool valves, electrical circuits including limit switches for energizing said solenoids in predetermined combinations depending upon which of said limit switches is actuated, high and low pressure pumps having their outlets connected to passages in said manifold plate, and two passages in said manifold plate for connection respectively to the ends of the hydraulic motor cylinder.

10. In a control apparatus for a machine having a part reciprocable by a hydraulic motor, the combination of a valve body having three bores therein, a spool valve reciprocable in each of said bores, a pilot valve for each of said spool valves, each of said pilot valves having one position in which fluid under pressure may flow through the pilot valve to one end of the spool valve and fluid from the other end of the spool valve bore may flow to a space of relatively low pressure, and having a second position in which the flow is in the opposite direction, a pair of solenoids connected to each of said pilot valves operable to move the pilot valve in opposite directions, and means to energize said solenoids sequentially in preselected combinations thereby to position the pilot valves and spool valves sequentially in a selected variety of positions to control the flow of hydraulic fluid to and from the ends of the cylinder of the hydraulic motor in predetermined directions at preselected rates.

11. In a hydraulic and electrical control apparatus for a machine tool having a reciprocable tool carrying head and having a plurality of limit switches and adjustable cams for actuating the switches in response to movement of the head to predetermined positions, and having a hydraulic motor for reciprocating the head, the combination of a hydraulic control assembly comprising a reservoir, a manifold plate mounted on the reservoir, said manifold plate having a plurality of passages therein, a valve block having three bores formed therein, three spool valves respectively reciprocable in said bores, each of said spool valves having two effective positions, a plurality of passages in said valve block connecting certain portions of the bores and also connecting said portions with passages in the manifold plate, a pair of solenoids for each spool valve, said solenoids having detent means to hold their plungers at the ends of their strokes, means connecting the plungers of the solenoids to said spool valves to move them between their two effective positions, electrical circuits including the limit switches for energizing said solenoids in one of a plurality of different predetermined combinations depending upon which of said limit switches is actuated, high and low pressure pumps having their outlets connected to passages in said manifold plate, and two pipes for connecting two passages in said manifold plate respectively to the ends of said hydraulic motor cylinder.

12. In a hydraulic and electrical control apparatus for a machine tool having a reciprocable tool carrying head and having a plurality of limit switches and adjustable cams for actuating the switches in response to movement of the head to predetermined positions, and having a hydraulic motor for reciprocating the head, the combination of a valve block having three bores formed therein, three spool valves respectively reciprocable in said bores, each of said spool valves having two effective positions, springs biased to move the spool valves to one of their effective positions, a plurality of passages in said valve block connecting certain portions of the bores, solenoids connected to the spool valves which when energized move them to their other effective positions in opposition to the forces applied thereto by their springs, electrical circuits including the limit switches for energizing said solenoids in predetermined combinations depending upon which of said limit switches is actuated, and passageways in the valve block for connection respectively to the outlets of high and low pressure pumps and to the ends of the motor cylinder.

13. In a hydraulic and electrical control apparatus for a machine tool having a reciprocable tool carrying head, having a plurality of limit switches and adjustable cams for actuating the switches in response to movement of the head to predetermined positions, and having a hydraulic motor for reciprocating the head; the combination of a hydraulic control assembly comprising a reservoir, a manifold plate mounted on the reservoir, said manifold plate having a plurality of passages therein, a valve block having three bores therein, three spool valves respectively reciprocable in said bores, each of said spool valves having two effective positions, a plurality of passages in said valve block connecting certain portions of the bores and also connecting portions of the bores with passages in the manifold plates; a pair of solenoids connected to each of the spool valves to move it in opposite directions between its two effective positions; electrical circuits including the limit switches for energizing said solenoids in predetermined combinations depending upon which of said limit switches is actuated; and means connected to said passageways for making connections respectively to the outlets of high and low pressure pumps and to the hydraulic motor.

14. A hydraulic and electrical control apparatus for a machine tool having a reciprocable tool carrying head and having a plurality of limit switches and adjustable cams for actuating the switches in response to movement of the head to predetermined positions, and having a hydraulic motor for reciprocating the head; the combination of a hydraulic control assembly comprising a reservoir having a top with openings therein, a manifold plate mounted on the top of the reservoir, said manifold plate having a plurality of passages therein some of which are in alignment with the openings in the top of the reservoir, a valve block having bores formed therein, means to secure the valve block to the manifold plate, spool valves respectively reciprocable in the bores of the valve block, a plurality of passages in said valve block connecting certain portions of the bores and also connecting said portions with passages in the manifold plate; solenoids for controlling the positioning of said spool valves; electrical circuits including the limit switches for energizing said solenoids in predetermined combinations depending upon which of said limit switches is actuated; high and low pressure pumps having their outlets connected to passages in said manifold plate; a second valve block detachably secured to said manifold plate and forming bodies for pressure control and feed control valves and having passages in sealed communication with passages in the manifold plate; and two pipes for connecting two passages in said manifold plate respectively to the ends of the hydraulic motor cylinder.

15. In a machine tool having a head movable by a reciprocating hydraulic motor comprising a cylinder and plunger, a control apparatus for controlling the supply of hydraulic fluid under pressure to one end of the motor cylinder and controlling the discharge of the hydraulic fluid from the other end of the cylinder, and having limit switches operable upon movement of the head to particular positions to cause the head to execute cycles including any useful sequence of the seven following steps: rapid forward, coarse and fine feed in forward or reverse directions, or both, rapid reverse, and automatic stop; the combination of a valve block having three bores therein, passages in the block connecting various portions of the bores, means including two pipes connecting two of the passages respectively to the ends of the motor cylinder, three spool valves respectively reciprocable in said bores, each of said spool valves having two effective positions, solenoids for controlling the movement of the spool valves between their effective positions, and electrical circuits including said limit switches to energize said solenoids in predetermined sequence to cause an operating cycle of the tool head to take place in any useful predetermined sequence of the foregoing named steps.

References Cited in the file of this patent

UNITED STATES PATENTS

| Number | Name | Date |
|---|---|---|
| 1,056,194 | Martineau | Mar. 18, 1913 |
| 1,560,705 | Mayer | Nov. 10, 1925 |
| 1,573,354 | Methlin | Feb. 16, 1926 |
| 2,559,339 | Andrew et al. | July 10, 1951 |